US 6,643,511 B1

United States Patent
Rune et al.

(10) Patent No.: US 6,643,511 B1
(45) Date of Patent: Nov. 4, 2003

(54) ADMINISTRATION OF REGIONAL SUBSCRIPTION RESTRICTION IN A NETWORK THAT INCLUDES A GATEWAY LOCATION REGISTER

(75) Inventors: Johan Rune, Lidingö (SE); Yun Chao Hu, Lidingö (SE); Juan Noguera-Rodriguez, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/547,991

(22) Filed: Apr. 12, 2000

Related U.S. Application Data
(60) Provisional application No. 60/128,786, filed on Apr. 12, 1999.

(51) Int. Cl.[7] ................................. H04Q 7/20
(52) U.S. Cl. ................ 455/433; 455/422.1; 455/432.1; 455/432.3; 455/436; 370/331
(58) Field of Search ................................ 455/414, 422, 455/432, 433, 436, 439; 370/331

(56) References Cited

U.S. PATENT DOCUMENTS

| | | | | |
|---|---|---|---|---|
| 5,467,381 A | * | 11/1995 | Peltonen et al. | 455/432 |
| 5,497,412 A | * | 3/1996 | Lannen et al. | 455/432 |
| 5,537,457 A | * | 7/1996 | Lantto et al. | 455/433 |
| 5,610,974 A | | 3/1997 | Lantto | |
| 5,867,788 A | * | 2/1999 | Joensuu | 455/445 |
| 5,878,397 A | * | 3/1999 | Stille et al. | 455/466 |
| 5,884,169 A | * | 3/1999 | Uchiyama et al. | 455/433 |
| 5,950,126 A | * | 9/1999 | Palviainen et al. | 455/423 |
| 6,032,044 A | * | 2/2000 | Shannon et al. | 455/433 |
| 6,366,777 B1 | * | 4/2002 | Uusitalo | 455/433 |

FOREIGN PATENT DOCUMENTS

| | | |
|---|---|---|
| DE | 196 40 288 A1 | 4/1998 |
| WO | 94/21090 WO | 9/1994 |

OTHER PUBLICATIONS

S. Chen et al.: "Fault Tolerance of PCS Mobility Databases"; Proceedings of the International Conference On Computer Communications and Networks, Sep. 22, 1997, IEEE, XP002061518 pp., 542–547.

"Procedure for Restoration of HLR", European Telecommunication Standard, vol. GSM 9.02, No. Version 3.8.0, 1991, p. 275, ETSI, XP000652720.

Yasuyuki Uchiyama et al.: "Network Functions and Signals for Personal Roaming Between Digital Cellular Standards"; NTT Mobile Communications Network Inc., Apr. 1995, 1995 Fourth IEEE International Conference On Universal Personal Communications Record Meiji Kinenkan, Tokyo, Japan Nov. 6–10, 1995, pp. 447–451.

PCT International Search Report dated May 10, 2001.
PCT International Search Report dated Jul. 27, 2000.

TS GSM 09.02, "Digital Cellular Telecommunications System (Phase 2+) Mobile Application Part (MAP) Specification", from ETSI, Mar. 12, 1999, pp. 472–475.

* cited by examiner

Primary Examiner—William Trost
Assistant Examiner—James D Ewart

(57) ABSTRACT

A method and apparatus for providing regional subscription data in a network where a gateway location register is serving networks in more than one country. Further, regional subscription information is also provided where a gateway location register serves a plurality of networks in the same country. In addition, efficient routing of mobile terminated short message service packets and packet data is provided.

29 Claims, 24 Drawing Sheets

ADMINISTRATION OF REGIONAL SUBSCRIPTION RESTRICTION IN A NETWORK THAT INCLUDES A GATEWAY LOCATION REGISTER

CROSS-REFERENCE TO RELATED APPLICATIONS

This application claims priority under 35 U.S.C. §§119 and/or 365 to U.S. Provisional Application No. 60/128,786 filed on Apr. 12, 1999, the entire content of which is hereby incorporated by reference. This application is also related to the following co-pending applications filed on Apr. 12, 2000: U.S. patent application Ser. No. 09/453,906 "Home Location Register Fault Recovery"; U.S. patent application Ser. No. 09/453,907 "Gateway Location Register Fault Recovery"; and U.S. patent application Ser. No. 09/453,908 "Support For Features Associated with A Subscriber in Networks With A gateway Location Register and A Visitor Location Register", all of which are herein expressly incorporated by reference.

BACKGROUND

The present invention relates to mobile communications systems, and more specifically, to the administration of regional subscription restrictions (i.e. when a subscription is restricted to certain geographical zones) when a subscriber is roaming in a network including a Gateway Location Register (GLR). The present invention also relates to the application of the GLR in the mobile station terminating Short Message Service (SMS) application. The present invention further relates to the application of the GLR within packet switched networks.

FIG. 1 illustrates a wireless communication system in accordance with the Global System for Mobile communication (GSM) standard. The GSM standard is designed to provide a uniform interface which allows mobile communication subscribers of various countries to operate their mobile devices regardless of the current location of the mobile subscriber. A mobile subscriber typically has a subscription with a network which is designated as the mobile subscriber's home public land mobile network 10 (HPLMN). The HPLMN 110 has a home location register (HLR) 115 which contains, among other things, various information regarding the services provided to the mobile subscriber. When a mobile subscriber roams into a different network, which is referred to as a visited public land mobile network 120 (VPLMN), the VPLMN requires certain data regarding the mobile subscriber's subscription. The data regarding the mobile subscriber's subscription is also known as the mobile subscriber's profile. The mobile subscriber's profile is transferred from the HLR to a visitor location register (VLR) in the VPLMN 120.

In a GSM system mobile subscriber data is stored within the VLR that is associated with the mobile services switching center (MSC) that currently serves the mobile subscriber in order to reduce internetwork signaling between VLRs and HLRs. The decentralization of the VLRs within a GSM system (i.e., each MSC being equipped with a VLR) reduces intranetwork signaling as well. So, for example, if the mobile subscriber is roaming in an area of the VPLMN 120 which is controlled by the MSC/VLR 130, the HLR 115 will transfer the mobile subscriber's profile to MSC/VLR 130. Similarly, if the mobile subscriber is roaming in an area controlled by MSC/VLR 135, the HLR 115 will transfer the mobile subscribers profile to MSC/VLR 135. Although FIG. 1 illustrates the MSC/VLR as a single network node, one skilled in the art will recognize that the MSC and VLR can be implemented as separate network elements.

To increase the compatibility of GSM with other types of systems, it is anticipated that future versions of the GSM standard, also called Universal Mobile Telecommunications System (UMTS), will incorporate elements of other mobile communications systems. For example, the Japanese Personal Digital Cellular (PDC) system includes a network node which is used to reduce internetwork signaling known as a gateway location register (GLR). FIG. 2 illustrates an exemplary mobile communications system in accordance with the PDC system. Like a GSM system, a home network 210 includes an HLR 215 which contains the mobile subscriber's profile. When a mobile subscriber roams into a visited network 220 the mobile subscriber's profile is transferred to GLR 225. In GSM terms, the GLR can be described as a VLR for all mobile subscribers roaming from other networks. Hence, only one GLR is needed for each network.

FIG. 3 illustrates an exemplary UMTS system which incorporates the GLR of the PDC system. When a mobile subscriber of HPLMN 310 roams into VPLMN 320, the HLR 315 will transfer the mobile subscriber's profile to GLR 325. Then, depending upon which area within the VPLMN 320 the mobile subscriber is roaming, the GLR 325 will transfer the mobile subscriber's profile to the respective MSC/VLR 330, 335 or 340. The introduction of the GLR 325 into a GSM/UMTS system reduces internetwork signaling because once the mobile subscriber roams into VPLMN 320, the HLR will only need to transfer the mobile subscriber's profile to GLR 325. GLR 325 will be responsible for transferring the mobile subscriber's profile to the proper MSC/VLR within VPLMN 320 as the mobile subscriber travels around the VPLMN 320.

The protocol used by GSM/UMTS systems for transferring data between MSC/VLRs and HLRs is the mobile application part (MAP). Since GLRs are optional elements within the UMTS system, MAP procedures must be completely independent of the presence or absence of GLRs in a network. Accordingly, by using an HLR interface towards the MSC/VLRs and an MSC/VLR interface towards the HLRs, the GLR should be completely transparent. However, because of the dual nature of the GLR in the network it may be difficult for the GLR to behave in a way which simultaneously will be perceived as MSC/VLR behavior by the HLRs, and as HLR behavior by the MSC/VLRs. One such case is the administration of regional zone subscription restrictions.

The Technical Standard (TS) GSM 09.02 (ETSI ETS 300 974) standard, i.e. MAP, specifies the procedures for administration of regional subscription restrictions for GSM networks. FIG. 4 illustrates a conventional method for transferring regional subscription restrictions from an HLR to an MSC/VLR. In step 405 an MSC/VLR receives a location update request from a mobile subscriber. In response to the location update request the MSC/VLR sends a MAP_UPDATE_LOCATION message to the HLR associated with the mobile subscriber in accordance with step 410. In step 415 the HLR extracts the Country Code (CC) and the National Destination Code (NDC) from the VLR Number parameter, i.e., the E.164 number, in the MAP_UPDATE_LOCATION message which was sent from the MSC/VLR to the HLR. A Country Code identifies the country in which the PLMN is located and a National Destination Code identifies the PLMN in that country.

In step 420 the mobile subscriber's HLR initiates the framed MAP_INSERT_SUBSCRIBER_DATA procedure to transfer relevant subscriber data to a new MSC/VLR. If regional subscription restrictions apply to the mobile subscriber, the MAP_INSERT_SUBSCRIBER_DATA message, or messages, will include the Regional Subscription Data parameter including Zone Codes indicating the geographical zones in which the mobile subscriber's subscription is valid. A Zone Code is the last part of the Regional Subscription Zone Identity (RSZI) and it identifies a regional subscription zone as a pattern of allowed and non-allowed location areas uniquely within a PLMN. Using these Zone Codes, an MSC/VLR can unambiguously determine whether a subscriber is entitled to service in his current location, provided that all the location areas in the service area of the MSC/VLR are located in the same country.

If the network spans more than one country, a Location Area Code, and consequently also a Zone Code can be ambiguous within a single network. Such a network would have to have separate Country Codes and National Destination Codes for the parts of the network that are located in different countries. If such an international network uses only one single GLR or if at least one GLR serve more than one country, there will be a problem in the administration of regional subscription restrictions.

FIG. 5 illustrates an exemplary UMTS network where a GLR serves MSC/VLRs located in more than one country. The network includes a home public land mobile network (HPLMN) 510, VPLMN 540 located in one country and VPLMN 570 which is located in a different country from VPLMN 540. HPLMN 510 includes an HLR 515 for storing mobile subscriber data. VPLMN 540 includes a GLR 545 and MSC/VLRs 550, 555 and 560. VPLMN 570 includes MSC/VLR 575. In the network of FIG. 5 GLR 545 serves MSC/VLRs in two different countries, i.e., VPLMN 540 and VPLMN 570. VPLMN 540 and VPLMN 570 could also be regarded as a single PLMN spanning more than one country.

Conventionally, when a mobile subscriber roams into an area supported by MSC/VLR 550, a MAP_UPDATE_LOCATION message would be sent from GLR 545 to HLR 515 only upon the first location update request of a series of consecutive location update requests from the roaming mobile subscriber in the concerned visited network. In the resulting MAP_INSERT_SUBSCRIBER_DATA message from the HLR 515 to GLR 545, the Regional Subscription Data parameter would include a list of Zone Codes which does not include CC and NDC for the allowed zones in the visited PLMN in that country. If the mobile subscriber subsequently roams into an area supported by MSC/VLR 575 which is located in a different country from MSC/VLR 550, GLR 545 would receive the MAP_UPDATE_LOCATION message from MSC/VLR 575 and GLR 545 would reply with a MAP_INSERT_SUBSCRIBER_DATA message including data from its own subscriber data records for the concerned subscriber. The problem is that the list of Zone Codes that were stored in the subscriber data in GLR 545 were based upon the CC and NDC of VPLMN 540, and hence, are no longer valid in the new country, i.e., in VPLMN 570. Accordingly, the GLR, and in turn MSC/VLR 575, will not be able to determine the allowed zones in VPLMN 570.

FIG. 6 illustrates an exemplary UMTS network where a GLR serves multiple networks within the same country. The network includes HPLMN 610. The network also includes GLR-PLMN 620, VPLMN 630 and VPLMN 650 all located within the same country. HPLMN includes HLR 615. GLR-PLMN 620 includes GLR 625. VPLMN 630 includes MSC/VLRs 635, 640 and 645, and VPLMN 650 includes MSC/VLRs 655, 660 and 665. One skilled in the art will recognize that GLR 625 could also be located in one of the PLMNs which it serves. Similar to the situation described above with respect to FIG. 5, if a mobile subscriber who is being served by MSC/VLR 635 in VPLMN 630 roams into an area served by MSC/VLR 655 in VPLMN 650, GLR 625 would not request updated mobile subscriber information from HLR 615. Accordingly, GLR 625 will only have stored regional subscription restriction information which is relevant to VPLMN 630. GLR 625 will not have regional subscription restriction information which is relevant to VPLMN 650. The main difference between the networks illustrated in FIG. 5 and the one illustrated in FIG. 6 is that in the network of FIG. 5 both the CC and the NDC are different in different VPLMNs, while in the network of FIG. 6 only the NDC changes, the CC remains the same.

The introduction of a GLR which serves MSC/VLRs in a UMTS network also causes problems for mobile terminating short message service (MT-SMS). Using conventional MT-SMS procedures the GLR will not be completely transparent in the network. In the case of MT-SMS, the GLR has to interwork with the gateway mobile switching center (GMSC), which acts as a proxy for the MT-SMS messages, to deliver the SMS messages towards the mobile subscriber.

FIG. 7 illustrates a conventional GSM network. When mobile subscriber 725 moves from a location area which is being served by MSC/VLR 715 to a location area served by MSC/VLR 720, the mobile subscriber 725 initiates a location update with MSC/VLR 720. In response to the location update, MSC/VLR 720 sends a MAP_UPDATE_LOCATION message to HLR 710 which is associated with mobile subscriber 725. The MAP_UPDATE_LOCATION message includes, among other things, VLR Number (an E.164 number) and MSC Address. The HLR 710 sends a MAP_CANCEL_LOCATION message, including the IMSI of the mobile subscriber 725 to MSC/VLR 715 to inform MSC/VLR 715 that the mobile subscriber 725 has moved to a location area being served by another MSC/VLR. In addition, HLR 710 completes the location updating procedure with MSC/VLR 720.

FIG. 8 illustrates an exemplary network for routing MT-SMS messages. When an MT-SMS message is sent to mobile subscriber 840 the MT-SMS message is routed to SMS GMSC 810 in the mobile subscriber's HPLMN. The SMS GMSC 810 requests the routing information from the HLR 820 via the MAP_SEND_ROUTING_INFORMATION_FOR_SMS message. The HLR 820 will provide the MSC address in a MAP_SEND_ROUTING_INFORMATION_FOR_SMS message so that the SMS GMSC 810 can forward the SMS message to MSC/VLR 830 which is currently serving mobile subscriber 840. MSC/VLR 830 will then forward the MT-SMS message to mobile subscriber 840.

FIG. 9 illustrates an exemplary UMTS network where GLR 910 is serving MSC/VLR 920 and MSC/VLR 930. As discussed above, when a mobile subscriber, such as mobile subscriber 960, roams for the first time into the VPLMN then MSC/VLR 930 will update the GLR 910 with its MSC/VLR identity (i.e., VLR number and MSC address) by sending the MAP_UPDATE_LOCATION message. The GLR 910 will detect that this is the first time that mobile subscriber 960 notifies itself within this VPLMN and will forward the MAP_UPDATE_LOCATION message to the HLR 940. The MAP_UPDATE_LOCATION message sent from GLR 910 to HLR 940 will include the GLR number and the address of GMSC 950. When mobile subscriber 960 roams into a location area served by MSC/VLR 920, MSC/VLR 920 sends the MAP_UPDATE_LOCATION message with the new MSC/VLR identity to GLR 910. GLR 910 recognizes that mobile subscriber 960 was already present within the VPLMN and will not forward the MAP_UPDATE_LOCATION message towards the HLR 940.

FIG. 10 illustrates an exemplary UMTS network for MT-SMS message routing where GLR 1040 serves a plurality of MSC/VLRs. When an MT-SMS message is sent to mobile subscriber 1060 the message is routed to SMS GMSC 1010 located in the mobile subscriber's HPLMN. SMS GMSC 1010 will request the routing information from the HLR 1020 via the MAP_SEND_ROUTING_INFORMATION_FOR_SMS message. The HLR 1020 will provide address of GMSC 1030 which is serving the network which the mobile subscriber 1060 is currently located. SMS GMSC 1010 forwards the MAP_MT_FORWARD_SHORT_MESSAGE message to GMSC 1030. GMSC 1030 requests routing information from GLR 1040. Using the routing information provided by GLR 1040 the GMSC 1030 forwards the MAP_MT_FORWARD_SHORT_MESSAGE message to MSC/VLR 1050. MSC/VLR 1050 then forwards the MAP_MT_FORWARD_SHORT_MESSAGE message to mobile subscriber 1060.

There are several deficiencies to the MT-SMS message routing in the networks described above. First, the GMSC node introduces one additional hop in the path of the SMS messages, i.e., the SMS GMSC must route the MT-SMS message to the GMSC in the UMTS network of FIG. 10, whereas the SMS GMSC can route the MT-SMS message directly to the MSC/VLR in the GSM network of FIG. 8. Further, it is contemplated that the GMSC will be closely allocated to the GLR, preferably implemented on the same platform. In addition it is contemplated that the interworking serving generic packet radio service support node (I-SGSN) will be implemented on the same platform as the GLR to support the Network Initiated Packet Data Protocol (PDP). This will introduce a very complex platform that will contain a GLR, GMSC and an ISGSN. Also the GMSC will need to be enhanced to support functionality to terminate SMS messages, such as MAP_SEND_ROUTING_INFORMATION_FOR_SMS. Further, since the SMS GMSC will pack the IMSI into an SMS message parameter (SMS-DA) the GMSC needs to be enhanced to be able to unpack the SMS message to retrieve the IMSI.

The introduction of a GLR which serves serving generic packet radio service (GPRS) support nodes (SGSNs) in a UMTS network also causes problems when implementing GPRS. When implementing PDP in a UMTS network where a GLR serves a plurality of SGSNs the GLR may not be completely transparent to the other nodes in the network. In the case of GPRS the GLR has to take the role of the SGSN in addition to the role of the MSC/VLR. But since the SGSN is involved in the actual routing of data problems result.

FIG. 11 illustrates an exemplary GSM network for transferring packet data in a GSM network. The network includes an HLR 1110, SGSN 1120 and SGSN 1130. When mobile subscriber 1140 moves from a location area being served by SGSN 1120 to a location area being served by SGSN 1130, SGSN 1130 sends its identity, i.e., SGSN Number (an E.164 number) and SGSN Address (similar to an Internet Protocol (IP) address) to HLR 1110 via the MAP_UPDATE_GPRS_LOCATION message. HLR 1110 notifies SGSN 1120 that the mobile subscriber 1140 has roamed outside the area covered by SGSN 1120 via the MAP_CANCEL_LOCATION message. Further, HLR 1110 updates its subscriber records to indicate that mobile subscriber 1140 is currently being supported by SGSN 1130.

FIG. 12 illustrates the routing of packet data in an exemplary GSM network. The network includes an HLR 1210, a gateway GPRS signaling node (GGSN) 1220 and SGSN 1230. In a network initiated PDP context setup, mobile subscriber 1240 will be requested by the network to set up a PDP context so it can receive data packets. Data packets which are intended for mobile subscriber 1240 will be sent to GGSN 1220 which interfaces with HLR 1210 of mobile subscriber 1240. To enable GGSN 1220 to request that the mobile subscriber 1240 setup a PDP context, GGSN 1220 must know the SGSN address of the SGSN in whose service area the mobile subscriber 1240 is currently located. Accordingly, GGSN 1220 requests the routing information from HLR 1210 via the MAP_SEND_ROUTING_INFORMATION_FOR_GPRS message. HLR 1210 provides the address of SGSN 1230 to GGSN 1220. Using the address provided by HLR 1210, GGSN forwards the MAP_PDU_NOTIFICATION_REQUEST message via the SGSN 1230 to the mobile subscriber 1240.

FIG. 13 illustrates an exemplary UMTS network for packet data communication where a GLR serves a plurality of SGSNs. The network includes HLR 1310, GLR 1320, I-SGSN 1330, SGSN 1340 and SGSN 1350. When mobile subscriber 1360 roams for the first time into the VPLMN, SGSN 1340 updates GLR 1320 with its SGSN identity, i.e. SGSN number and SGSN address, by sending a MAP_UPDATE_GPRS_LOCATION message. GLR 1320 detects that this is the first time that the mobile subscriber notifies itself within this VPLMN, and GLR 1320 forwards a MAP_UPDATE_GPRS_LOCATION message to HLR 1310. Prior to forwarding the MAP_UPDATE_GPRS_LOCATION message, GLR 1320 replaces the SGSN identity with the GLR and I-SGSN identities, i.e. GLR number and ISGSN address.

When the mobile subscriber 1360 roams into a location area served by SGSN 1350, SGSN 1350 sends a MAP_UPDATE_GPRS_LOCATION message to GLR 1320 with the new SGSN identity. However, GLR 1320 recognizes that mobile subscriber 1360 was already present within the VPLMN and will not forward the MAP_UPDATE_GPRS_LOCATION message to HLR 1310. Accordingly, because of the introduction of the GLR to save signaling traffic between the HPLMN and VPLMN, the HLR will not contain the SGSN addresses but rather the address of the I-SGSN node that relays the packets to the SGSN which is currently serving the roaming mobile subscriber.

FIG. 14 illustrates the transfer of packet data to a roaming mobile subscriber in a UMTS network where a GLR serves a plurality of SGSNs. In a network initiated PDP context setup, the GGSN 1420 requests the routing information from HLR 1410 using a MAP_SEND_ROUTING_INFORMATION_FOR_GPRS message. HLR 1410 provides GGSN 1420 with the address of I-SGSN 1440. Using the address of I-SGSN 1440, GGSN 1420 forwards a MAP_PDU_NOTIFICATION_REQUEST message to I-SGSN 1440. I-SGSN 1440 requests routing information from GLR 1450. GLR 1450, based upon the information in its mobile subscriber records, provides the routing information of the SGSN which is currently serving mobile subscriber 1460. Using this routing information I-SGSN forwards the MAP_PDU_NOTIFICATION_REQUEST message to SGSN 1430. SGSN 1430 then delivers the PDU Notification Request to mobile subscriber 1460.

The introduction of a GLR which serves a plurality of MSC/VLRs in a UMTS network has various deficiencies. For example, the I-SGSN node introduces an additional hop with the path of the data packets. The additional hop results in an increased delay time within the data packets path. This increased delay time is problematic for delay sensitive applications, such as video or multi-media type applications. In addition, the I-SGSN, GLR, GMSC may be one the same platform which would result in a very complex platform.

Accordingly, it would be desirable to provide methods and apparatus for providing relevant regional subscription restriction data to MSC/VLRs in a network where a GLR serves MSC/VLRs in more than one country. Further, it would be desirable to provide methods and apparatus for providing relevant regional subscription restriction data to MSC/VLRs in a network where a GLR serves more than one network in a single country. In addition, it would be desirable to provide methods and apparatus for providing efficient MT SMS message routing in a network where a GLR serves a plurality of MSC/VLRs. It would also be desirable to provide efficient PDP context setup for routing packet data in a network which includes a GLR serving a plurality of SGSNs.

SUMMARY

According to exemplary embodiments of the present invention, methods and apparatus are provided for providing regional subscription data to a serving visitor location register in a network where a gateway location register serves a first visitor location register in a first country and a second visitor location register in a second country. A location update is received from a mobile subscriber in a network. It is determined whether this is the first location update for the mobile subscriber in a network served by the gateway location register. It is also determined whether this is the first location update in a new country for the mobile subscriber. Regional subscription data is requested from a home location register associated with the mobile subscriber if the location update is not the first location update for the mobile subscriber in the network and if the location update is the first location update for the mobile subscriber in the new country.

In accordance with another aspect of the present invention, methods and apparatus are provided for providing regional subscription data to a serving visitor location register in a network where a gateway location register serves a first visitor location register in a first network and a second visitor location register in a second network, the first and second networks being located in a same country. A location update is received from a mobile subscriber in a network. It is determined whether this is the first location update for the mobile subscriber in the first and second networks. It is also determined whether this is the first location update for the mobile subscriber in a new network served by the gateway location register. Regional subscription data is requested from a home location register associated with the mobile subscriber if the location update is not the first location update for the mobile subscriber in the first and second networks and if the location update is the first location update for the mobile subscriber in the new network.

In accordance with yet another aspect of the present invention, methods and apparatus are provided for delivering short message service messages to a mobile subscriber located in a visited network in a network where a gateway location register serves a visitor location register. An indication is provided to a home location register associated with the mobile subscriber that the gateway location register is present in the visited network. An address of a mobile switching center which is serving the mobile subscriber in the visited network is requested from the gateway location register.

In accordance with a further aspect of the present invention, methods and apparatus are provided for delivering packet data to a mobile subscriber located in a visited network in a network where a gateway location register serves a serving support node. An indication is provided to a home location register associated with the mobile subscriber that the gateway location register is present in the visited network. An address of a serving support node which is serving the mobile subscriber in the visited network is requested from the gateway location register.

BRIEF DESCRIPTION OF THE DRAWINGS

The present invention will now be described with reference to the accompanying drawings in which.

DETAILED DESCRIPTION

In the following description, for purposes of explanation and not limitation, specific details are set forth, such as particular sequences of inter and intra network signaling, types of messages, etc. in order to provide a thorough understanding of the present invention. However, it will be apparent to one skilled in the art that the present invention may be practiced in other embodiments that depart from these specific details. In other instances, detailed descriptions of well-known methods, devices, and network elements are omitted so as not to obscure the description of the present invention.

The exemplary radio communication systems discussed herein are described as operating in accordance with the UMTS system, however, one skilled in the art will recognize that the present invention can be implemented in other mobile communications systems where a gateway is used to reduce internetwork signaling.

Figure 1:
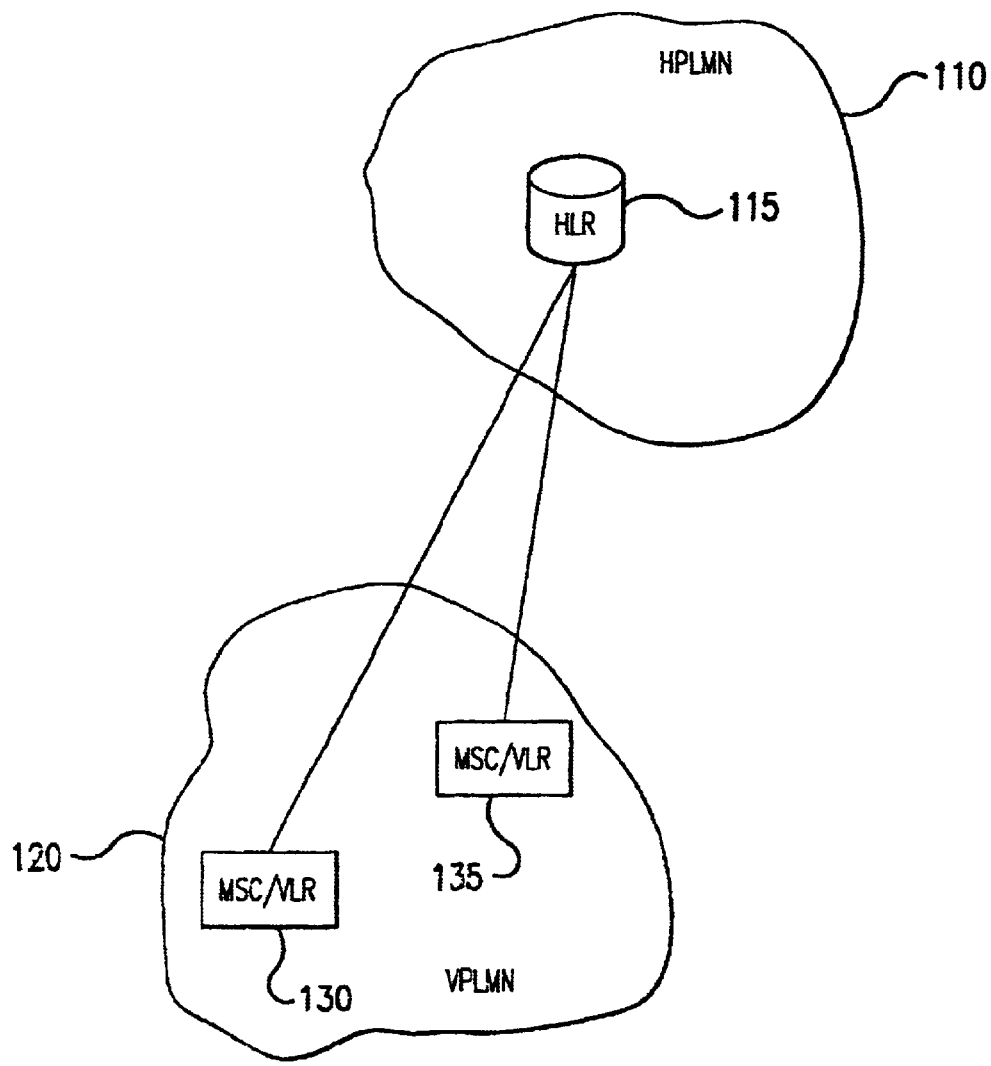
FIG. 1 illustrates a conventional GSM network.
Figure 2:
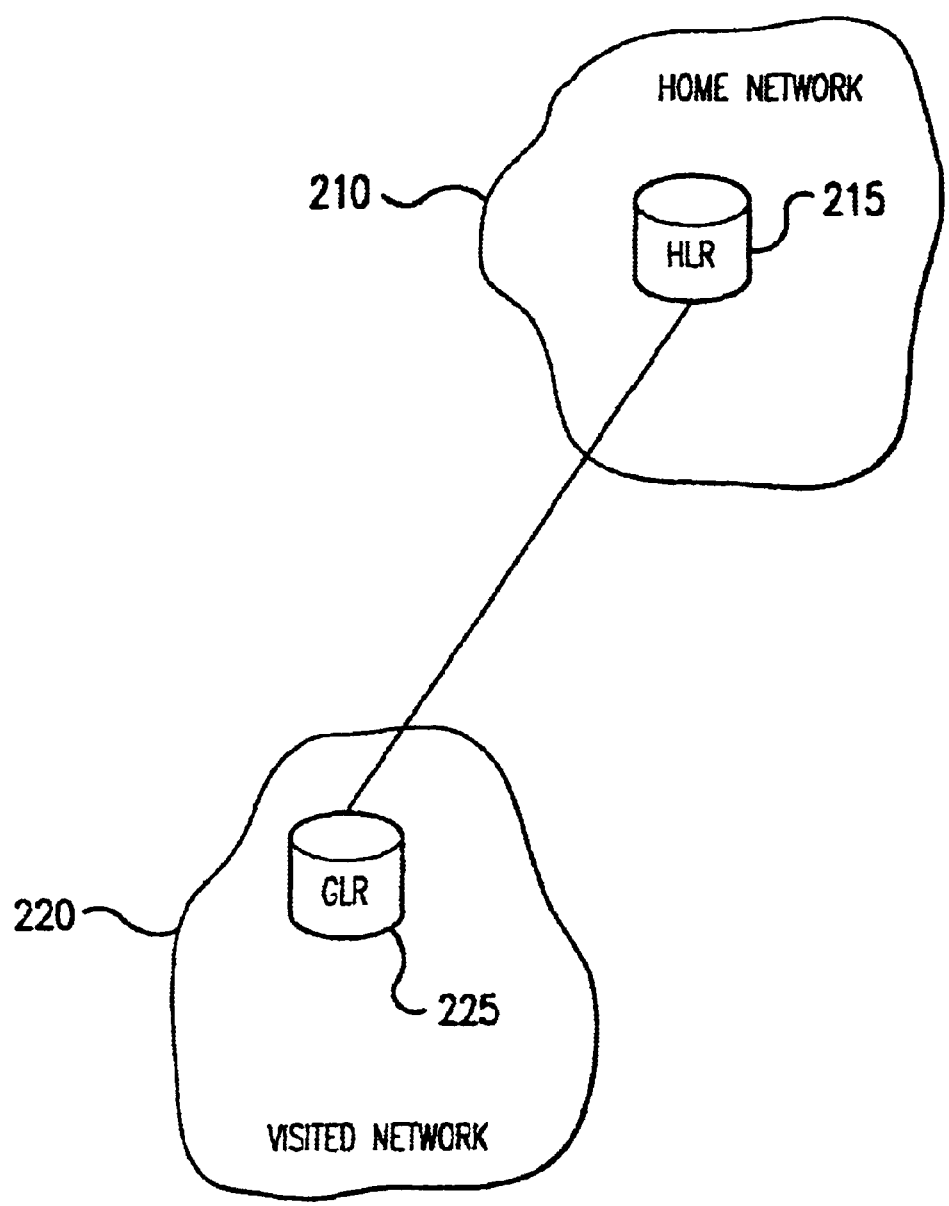
FIG. 2 illustrates a conventional PDC network.
Figure 3:
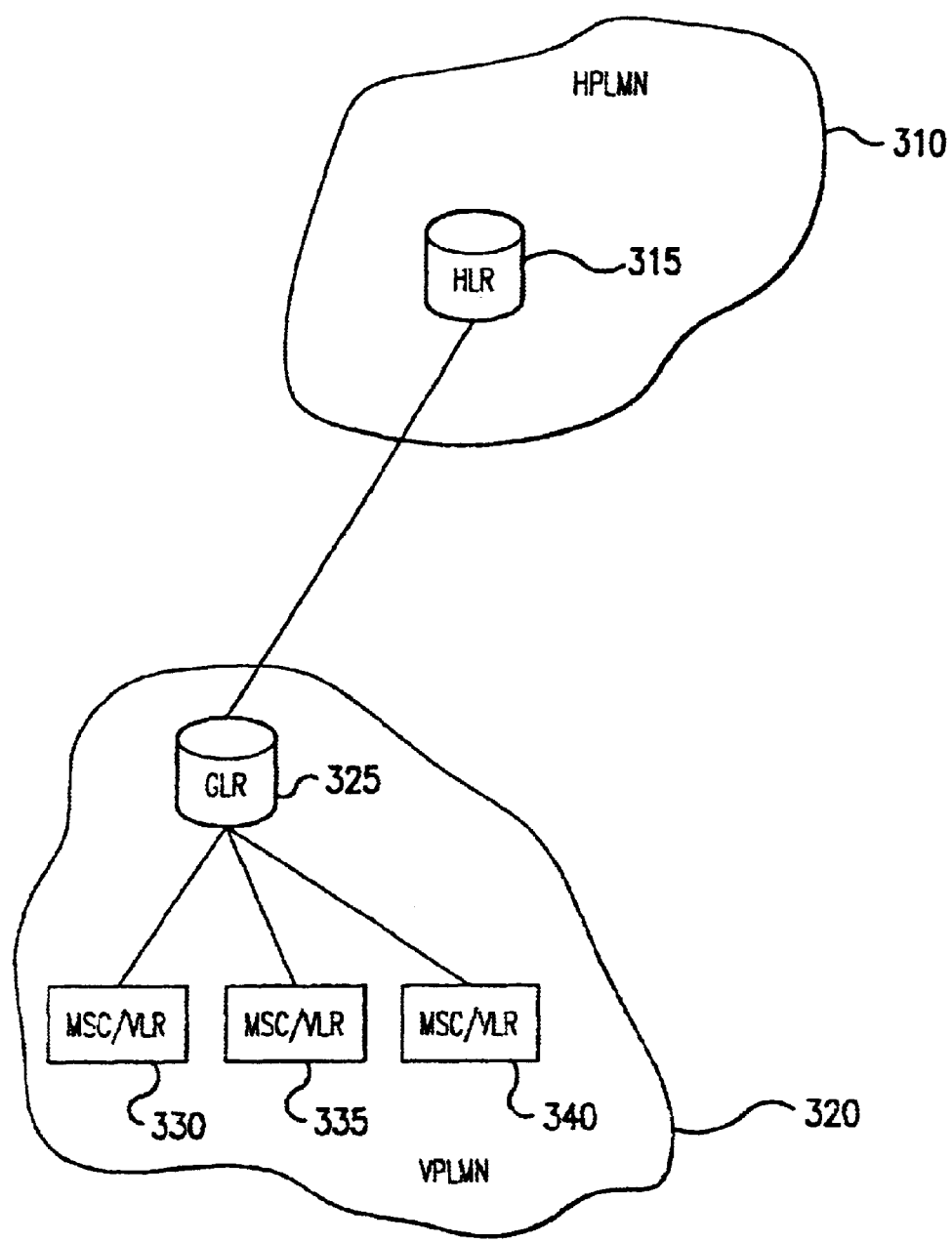
FIG. 3 illustrates the relationship of UMTS network elements in a network which includes a GLR.
Figure 4:
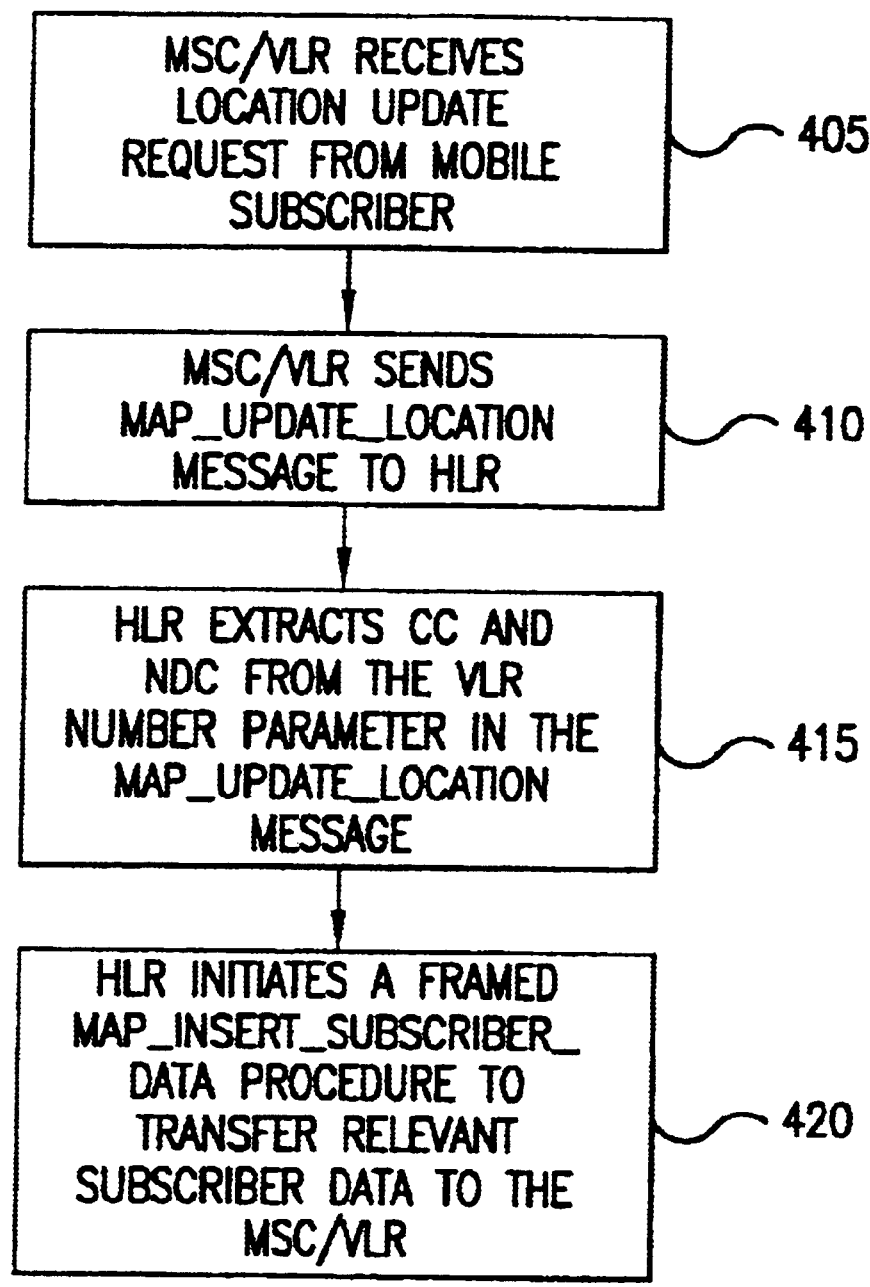
FIG. 4 illustrates a conventional method for transferring regional subscription restrictions from an HLR to an MSC/VLR.
Figure 5:
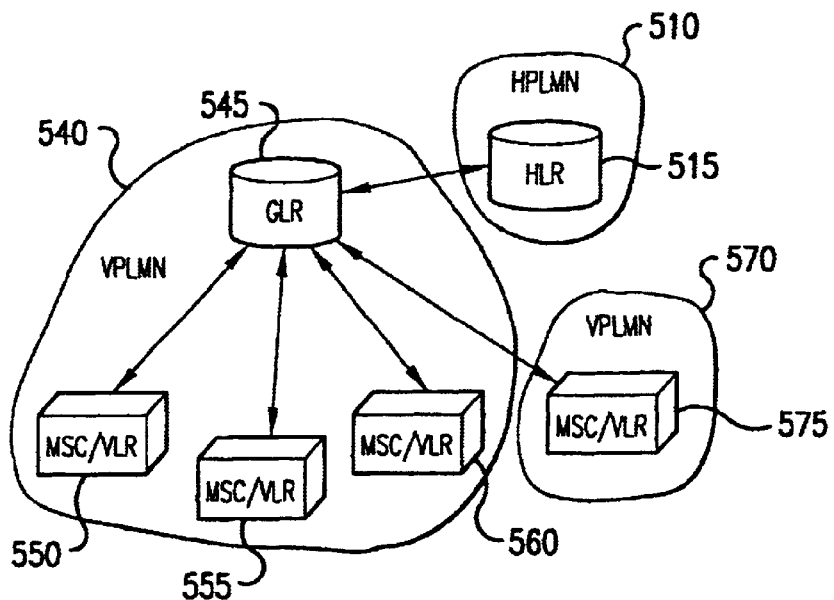
FIG. 5 illustrates an exemplary UMTS network where a GLR serves MSC/VLRs located in more than one country.
Figure 6:
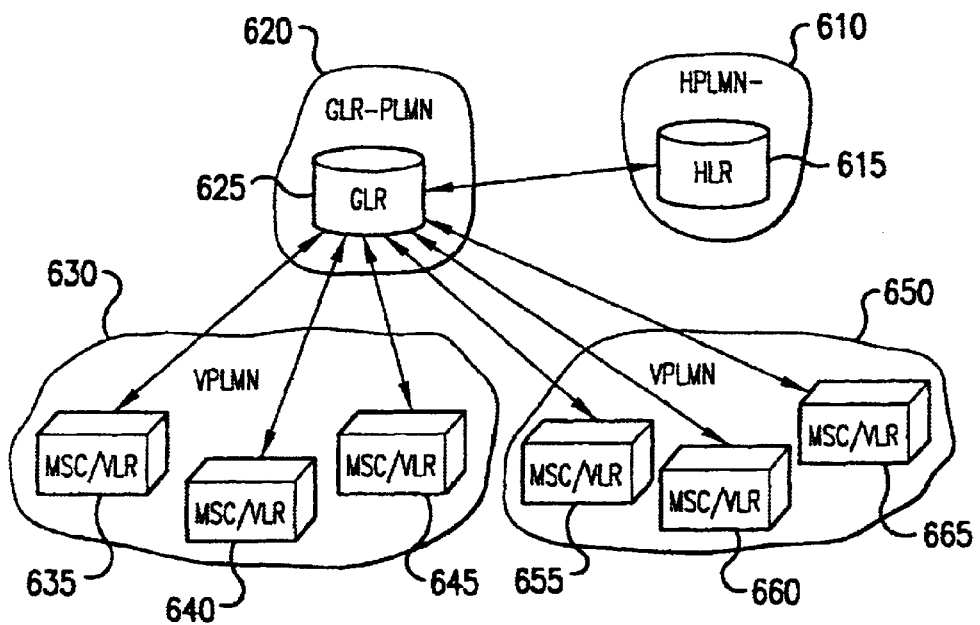
FIG. 6 illustrates an exemplary UMTS network where a GLR serves multiple networks within the same country.
Figure 7:
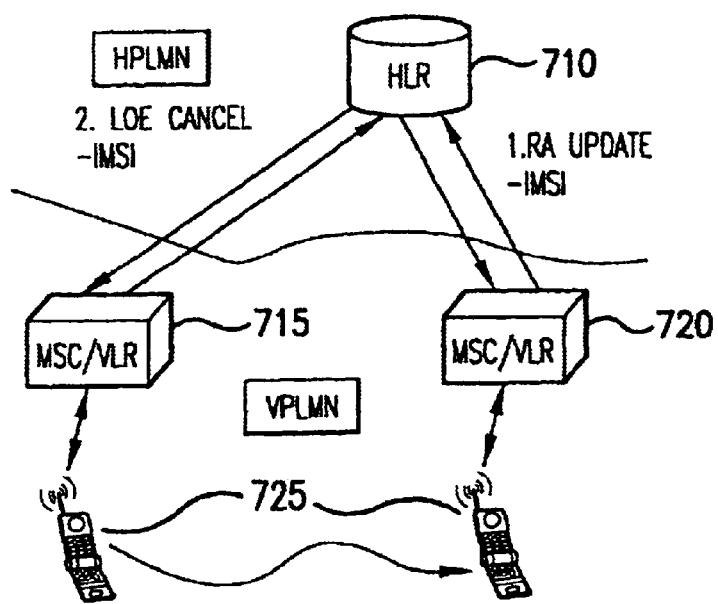
FIG. 7 illustrates a conventional GSM network.
Figure 8:
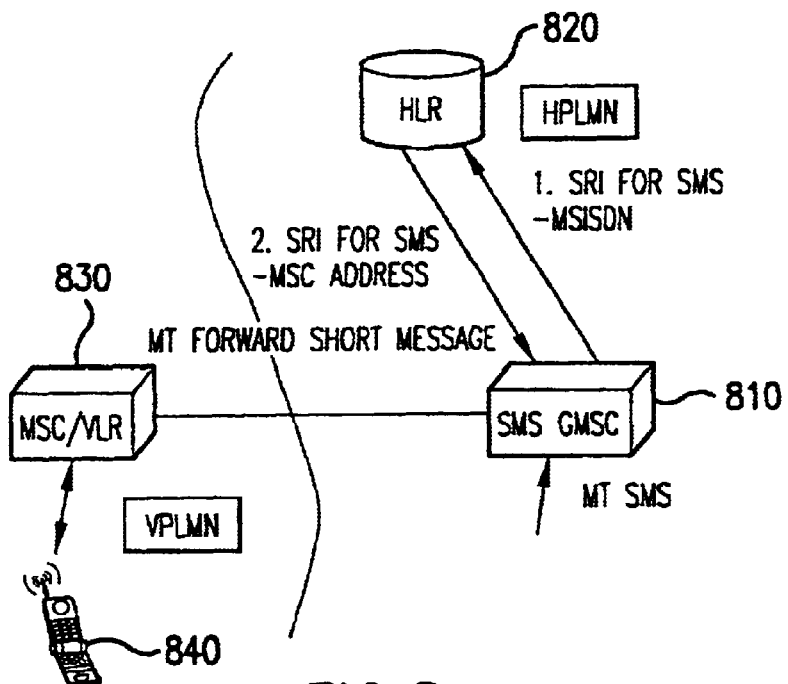
FIG. 8 illustrates an exemplary network for routing MT-SMS messages.
Figure 9:
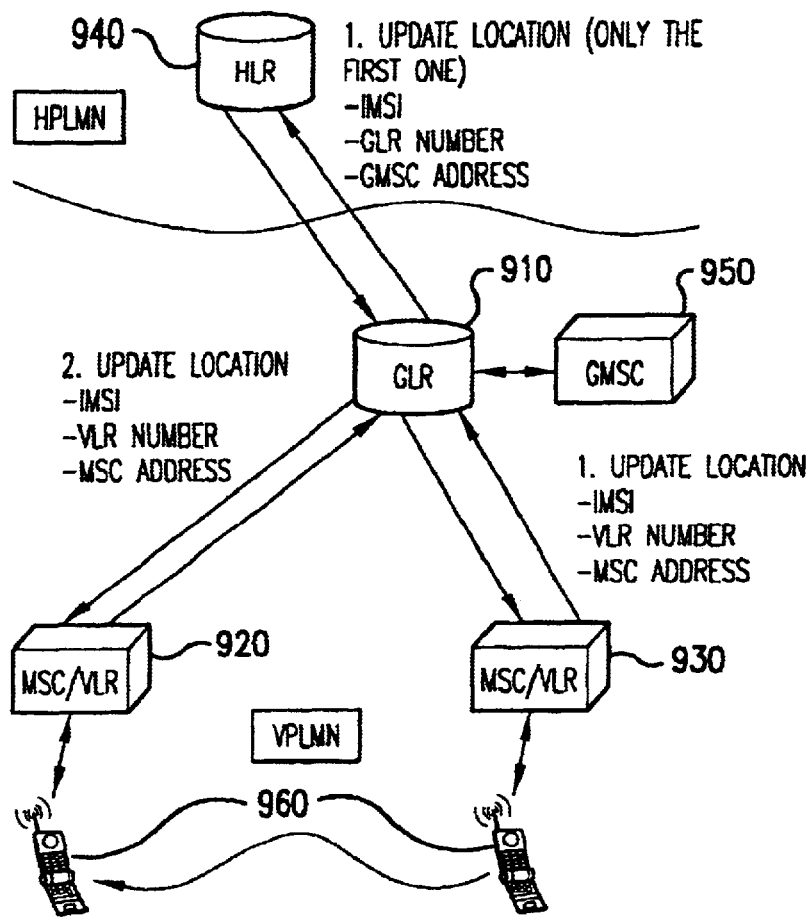
FIG. 9 illustrates an exemplary UMTS network where a GLR serves a plurality of MSC/VLRs.
Figure 10:
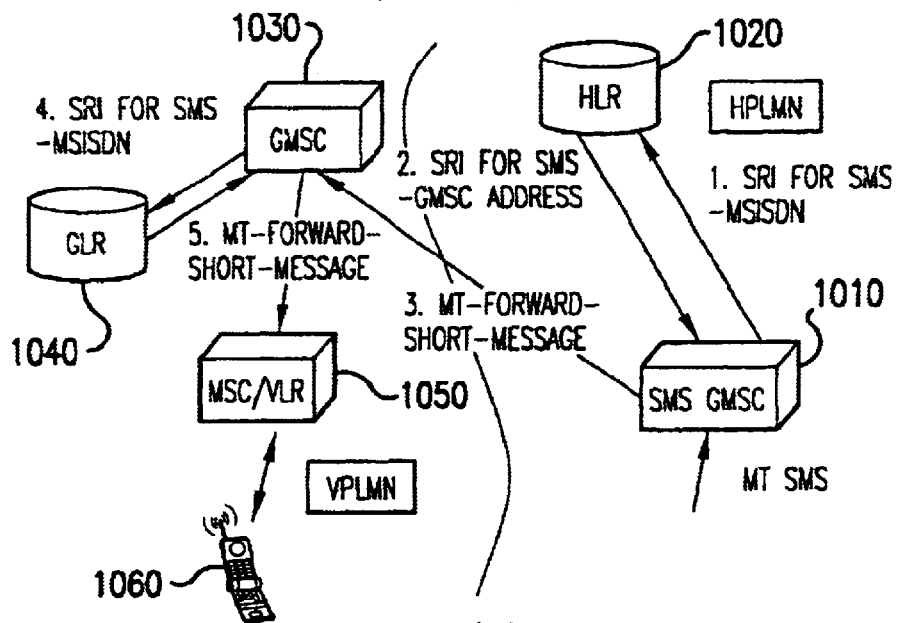
FIG. 10 illustrates an exemplary UMTS network for MT-SMS message routing where a GLR serves a plurality of MSC/VLRs.
Figure 11:
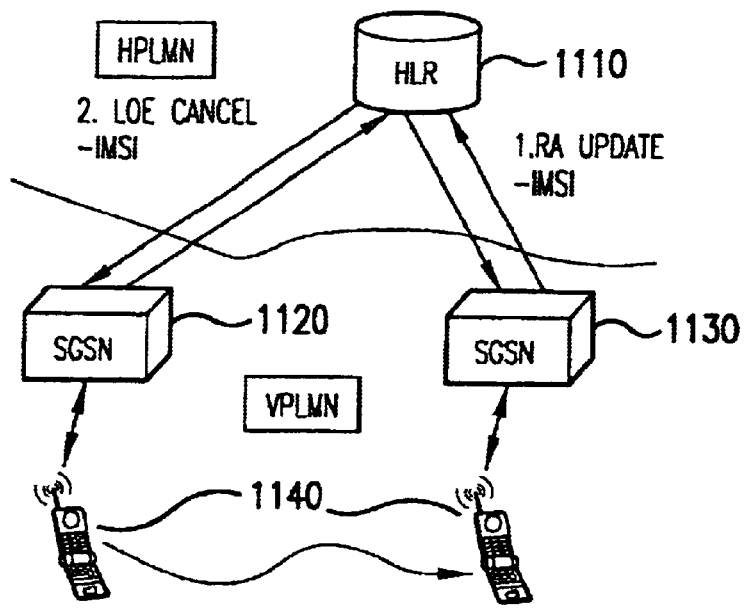
FIG. 11 illustrates an exemplary GSM network for transferring packet data in a GSM network.
Figure 12:
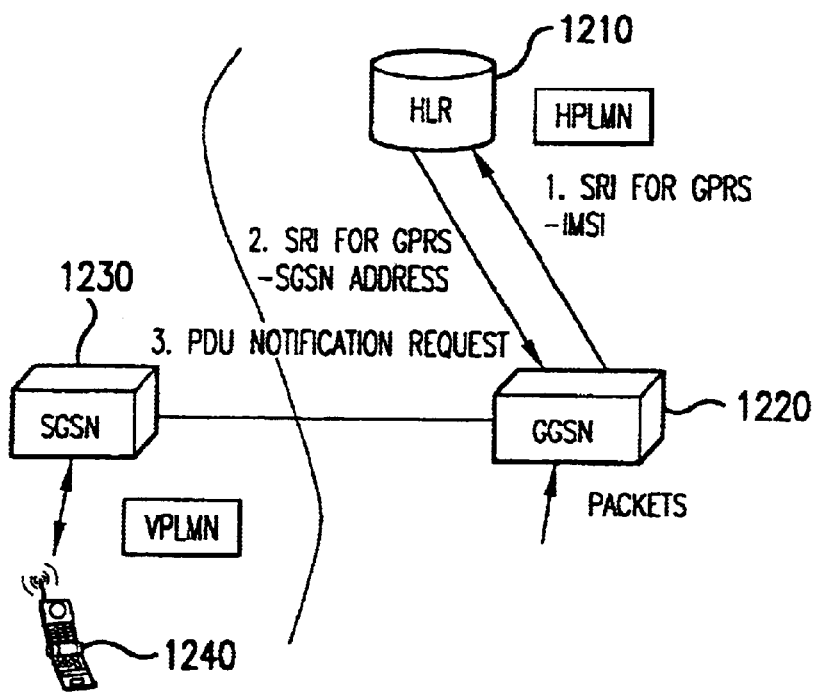
FIG. 12 illustrates the routing of packet data in an exemplary GSM network.
Figure 13:
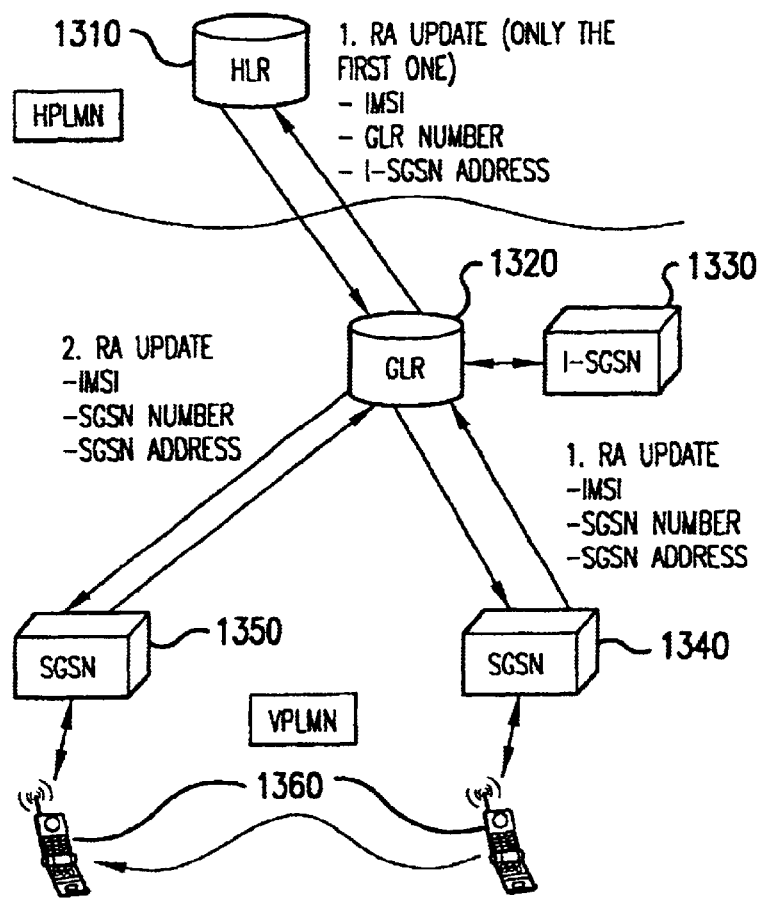
FIG. 13 illustrates an exemplary UMTS network for packet data communication where a GLR serves a plurality of SGSNs.
Figure 14:
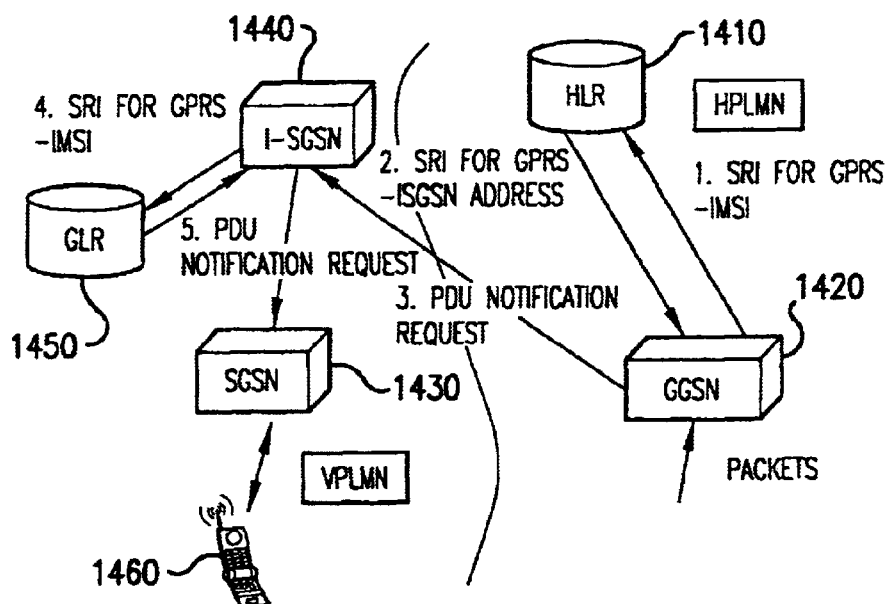
FIG. 14 illustrates the transfer of packet data to a roaming mobile subscriber in a UMTS network where a GLR serves a plurality of SGSNs.
Figure 15:
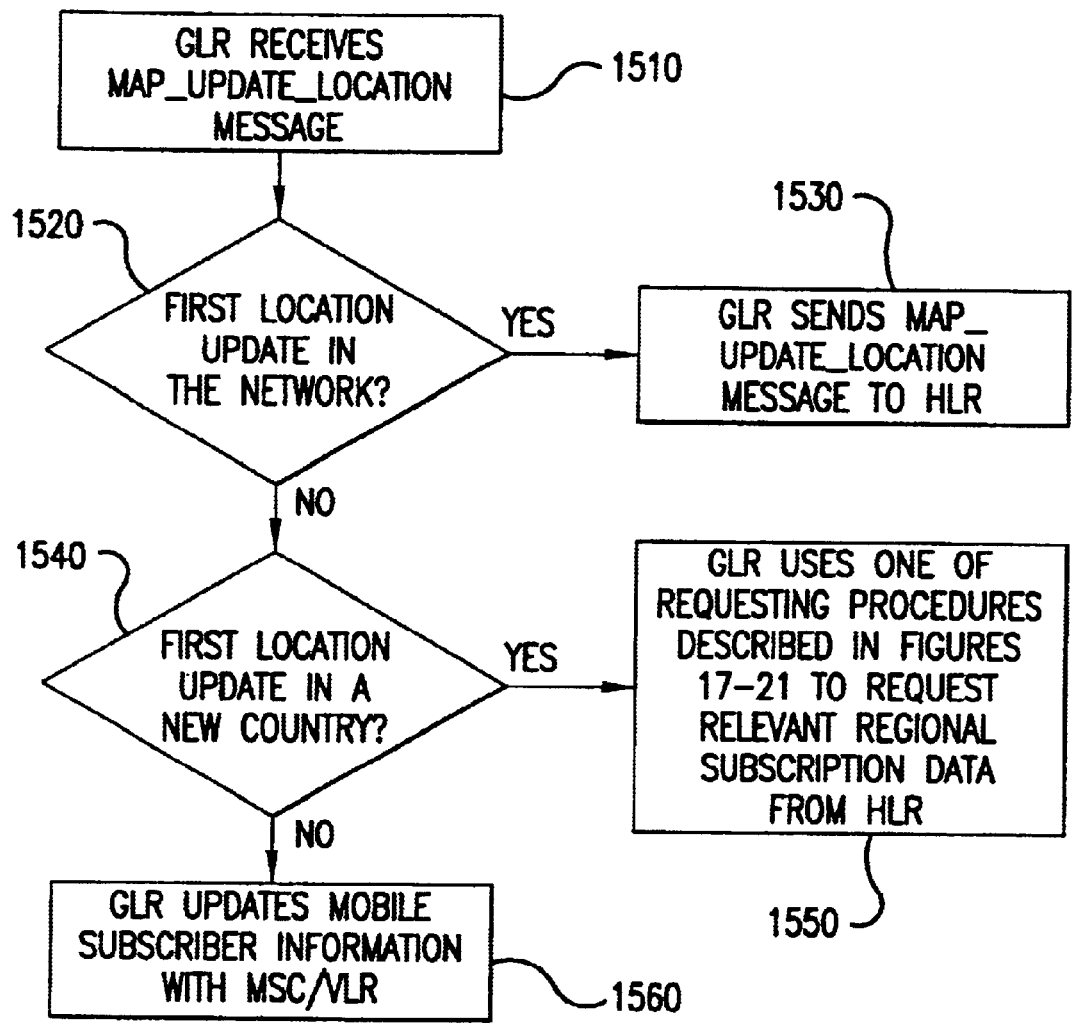
FIG. 15 illustrates an exemplary method in a GLR for determining when regional subscription data should be requested by a GLR when the GLR serves MSC/VLRs in more than one country in accordance with one embodiment of the present invention.

FIG. 15 illustrates an exemplary method for determining when regional subscription data should be requested by a GLR when the GLR serves MSC/VLRs in more than one country in accordance with one embodiment of the present invention. In step 1510 the GLR receives a MAP_UPDATE_LOCATION message from an MSC/VLR served by the GLR. In step 1520 the GLR determines whether this is the first location update in the network for the mobile subscriber, i.e., whether or not the mobile subscriber has previously been served by another MSC/VLR which is served by the GLR without the mobile subscriber having been served by an MSC/VLR which is not served by the GLR in between the location updates. The GLR can determine whether this is the first location update in the network by the mobile subscriber by checking whether there is already a record for the concerned subscriber stored in the GLR. If this is the first location update for the mobile subscriber in the network, in accordance with the "Yes" path out of decision step 1520, the GLR sends a MAP_UPDATE_LOCATION message to the HLR associated with the mobile subscriber in accordance with step 1530.

If the mobile subscriber has previously performed a location update in the network, in accordance with the "No" path out of decision step 1520, the GLR determines whether this is the first location update for the mobile subscriber in a new country in accordance with step 1540. The GLR can determine whether this is the first location update for the mobile subscriber in a new country by comparing the CC of the new VLR number, which is received in the MAP_UPDATE_LOCATION message from the MSC/VLR, with the CC of the VLR number which previously was serving the mobile subscriber, which was already stored in the GLR. If this is the first location update for the mobile subscriber in a new country, in accordance with the "Yes" path out of decision step 1540, the GLR uses one of the procedures described below in connection with FIGS. 17–21 to request the relevant regional subscription data from the HLR in accordance with step 1550. If the mobile subscriber has previously performed a location update in this country, in accordance with the "No" path out of decision step 1540, the GLR updates the mobile subscriber information with the MSC/VLR using the regional subscription information stored in the GLR in accordance with step 1560.

Figure 16:
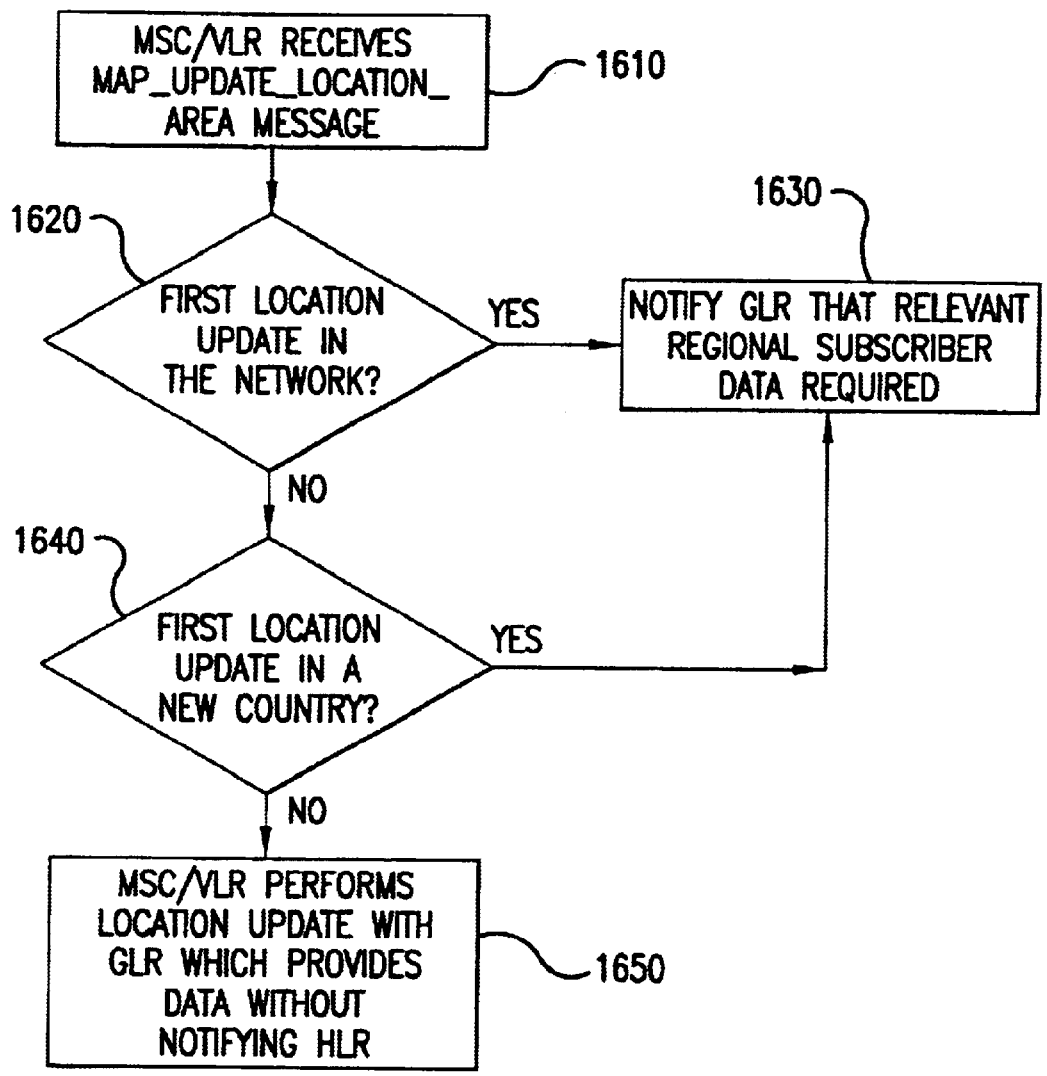
FIG. 16 illustrates an exemplary method in an MSC/VLR for determining when regional subscription data should be requested by a GLR when the GLR serves MSC/VLRs in more than one country in accordance with another embodiment of the present invention.

FIG. 16 illustrates an exemplary method for determining when regional subscription data should be requested by a GLR when the GLR serves MSC/VLRs in more than one country in accordance with another embodiment of the present invention. In accordance with this embodiment of the present invention the MSC/VLR determines whether updated regional subscription data is required. In step 1610 the MSC/VLR receives a MAP_UPDATE_LOCATION_AREA message from a mobile subscriber. In step 1620 the MSC/VLR determines whether this is the first location update in the network. The MSC/VLR can determine whether this is the first location update in the network by comparing the Mobile Country Code (MCC) and Mobile Network Code (MNC) of the old Location Area Identity with the MCCs and MNCs of the MSC/VLR's own network. This would require the MSC/VLR to recognize all the different pairs of MCCs and MNCs of the international network, i.e, the network served by the GLR. The MCC and MNC are defined in ITU-T Recommendation E.214 and are similar to the CC and NDC which are defined in ITU-T Recommendation E.164. One skilled in the art will recognize that the MCC and MNC can be converted to a CC and NDC, and vice versa. Accordingly, where the MCC and MNC are mentioned in this application, one skilled in the art will recognize that the CC and NDC, respectively, can be substituted.

If the MSC/VLR determines that this is the first location update for the mobile subscriber in the network, in accordance with the "Yes" path out of decision step 1620, the MSC/VLR will notify the GLR that the relevant regional subscription data is required in accordance with step 1630. The indication that relevant regional subscription data is required could be a new optional parameter in the MAP_UPDATE_LOCATION message sent from the MSC/VLR to the GLR. One skilled in the art will recognize that if the MSC/VLR determines this is the first location update for the mobile subscriber in the network that the GLR, as part of the location updating procedure, will always be implicitly requesting the regional subscription data. Hence, if the MSC/VLR determines that this is the first location update for the mobile subscriber in the network the MSC/VLR the additional indication to the GLR is redundant, and can be omitted.

If the MSC/VLR determines that the mobile subscriber has previously performed a location update in the network, in accordance with the "No" path out of decision step 1620, the MSC/VLR determines whether this is the first location update for the mobile subscriber in a new country in accordance with step 1640. The MSC/VLR can determine whether this is the first location update for the mobile subscriber in a new country by comparing MCC of the old location area with the MCC of the new location area.

If the MSC/VLR determines that this is the first location update for the mobile subscriber in a new country, in accordance with the "Yes" path out of decision step 1640, the MSC/VLR notifies the GLR that relevant regional subscription data is required in accordance with step 1630. Again, the MSC/VLR can provide this notification using a new optional parameter in the MAP_UPDATE_LOCATION message sent from the MSC/VLR to the GLR. If this is not the first location update for the mobile subscriber in a new country, i.e., the mobile subscriber has previously performed a location update in this country, in accordance with the "No" path out of decision step 1640, the MSC/VLR performs a location updating procedure with the GLR and the GLR provides the mobile subscriber's information without notifying the HLR in accordance with step 1650.

Figure 17:
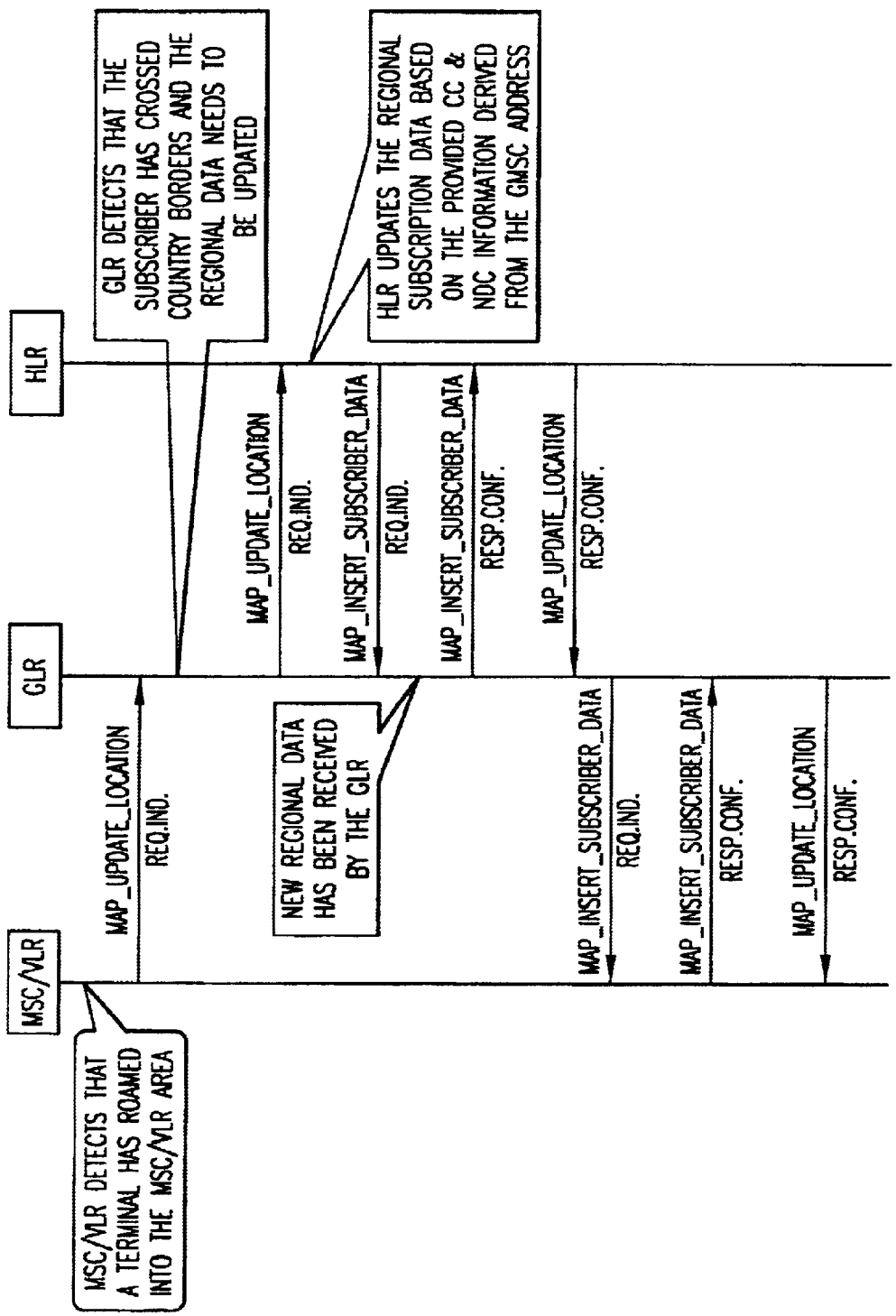
FIGS. 17–21 illustrate exemplary signaling for requesting from an HLR regional subscription information for a particular mobile subscriber in a UMTS network where a GLR serves MSC/VLRs in more than one country in accordance with various embodiment of the present invention.

FIG. 17 illustrates exemplary signaling for requesting from an HLR regional subscription information for a particular mobile subscriber in a UMTS network where a GLR serves MSC/VLRs in more than one country in accordance with one embodiment of the present invention. When an MSC/VLR detects that a mobile subscriber has roamed into a location area served by the MSC/VLR, the MSC/VLR sends a MAP_UPDATE_LOCATION request message to the GLR. The GLR detects that the mobile subscriber has crossed country borders and forwards the MAP_UPDATE_LOCATION request message. The MAP_UPDATE_LOCATION request message sent from the GLR includes the GLR number instead of the VLR number and the GMSC address of the GMSC located in the country of the MSC/VLR from which the GLR received the MAP_UPDATE_LOCATION request message. The GLR can detect that the mobile subscriber has crossed country borders either using the method of FIG. 15 or by an indication from the MSC/VLR as described in connection with FIG. 16.

The HLR can identify the VPLMN by examining the CC and NDC of received GLR Number. One skilled in the art will appreciate that the HLR can alternatively identify the VPLMN by examining the Originating Address parameter in the MAP_OPEN request message. Having the HLR examine the received GLR number to identify the VPLMN does not significantly increase the processing in the HLR because the significant parts of the GLR number for this purpose, i.e., the CC and NDC, need to be recognized by the HLR only in the cases when there are mobile subscribers associated with the HLR for whom there are regional subscription zones defined for the visited network. In other cases no regional subscription data would be sent to the GLR anyway. A VPLMN for which an HLR has regional subscription restrictions defined would require some type of special agreement between the operators of the two networks. Accordingly, an HLR may not often be required to make such a determination.

Next the HLR determines for which country, i.e., which CC and which NDC, of the different countries that are spanned by the visited network that it should provide regional subscription data. The HLR can make this determination by examining the CC of the received GMSC address. The NDC in the GMSC address provides the HLR with the complete pair of codes, i.e., the CC and the NDC, that are needed for the HLR to select the appropriate regional subscription data, i.e., the list of Zone Codes, to send to the GLR. Alternatively, the HLR can select the appropriate regional subscription data by ignoring the GLR number, for the purpose of selecting regional subscription data, and just extract the CC and the NDC from the GMSC address.

The HLR then provides the appropriate regional subscription data in the MAP_INSERT_SUBSCRIBER_DATA request message. The GLR responds with a MAP_INSERT_SUBSCRIBER_DATA response confirmation and the HLR completes the location updating procedure with the GLR by sending a MAP_UPDATE_LOCATION response confirmation.

Once the GLR has completed the location updating procedure with the HLR the GLR provides the regional subscription data in the MAP_INSERT_SUBSCRIBER_DATA request message. The MSC/VLR responds with a MAP_INSERT_SUBSCRIBER_DATA response confirmation. The location updating procedure between the GLR and the MSC/VLR is completed by the GLR sending a MAP_UPDATE_LOCATION response confirmation message to the MSC/VLR. The procedure described above in connection with FIG. 17 may require at least one GMSC in each of the countries that are spanned by the visited network. Further, for mobile subscribers having regional subscription zones defined for the networks served by the GLR, the procedure produces the same results as having a different GLR in each country in the international network.

FIGS. 18–21 illustrate signaling procedures with similar messages to those described above in connection with FIG. 17. For the sake of clarity, a detailed description of the messages in FIGS. 18–21 which perform a similar function to those described above in connection with FIG. 17 will be omitted.

Figure 18:
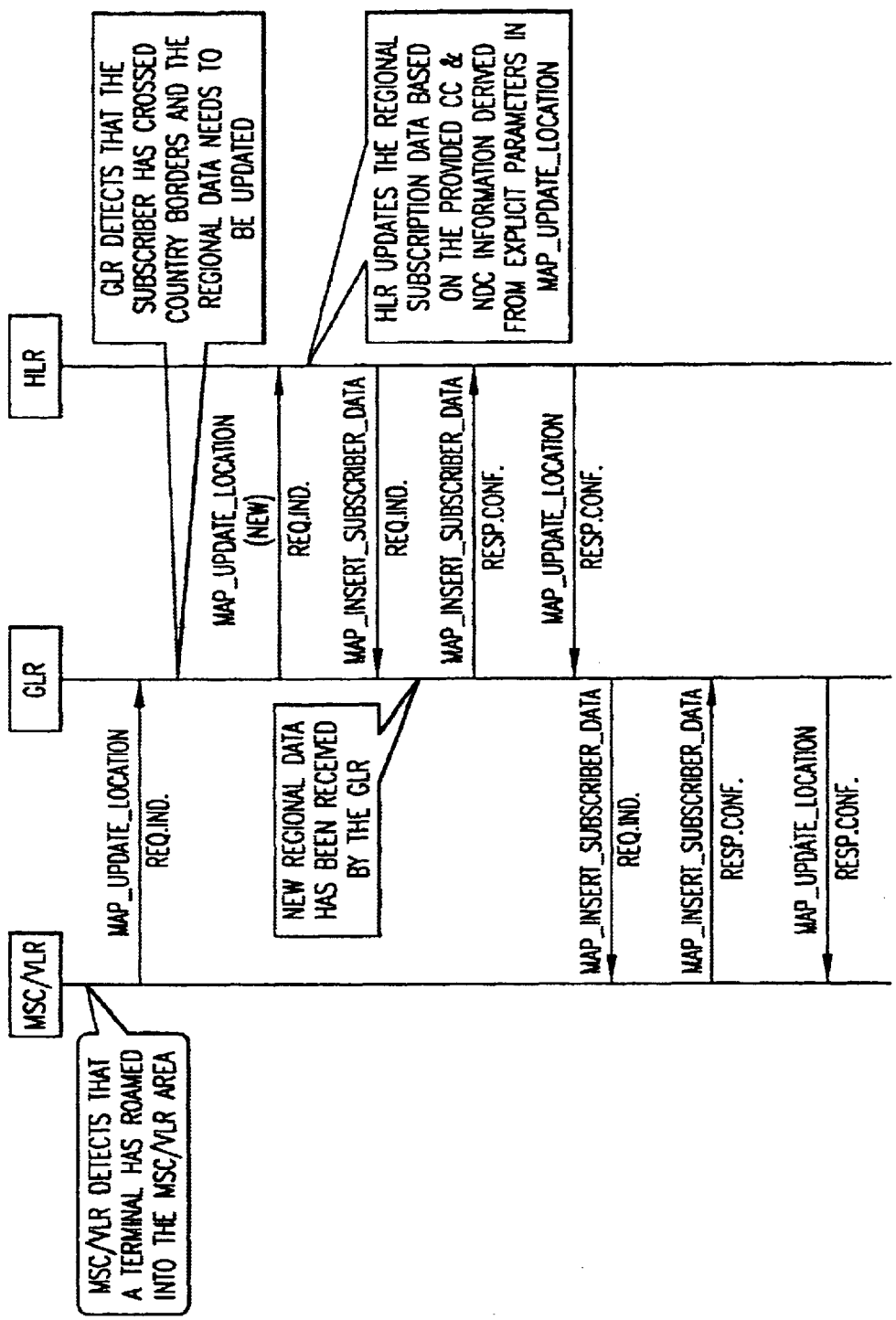

FIG. 18 illustrates exemplary signaling for requesting from an HLR regional subscription information for a particular mobile subscriber in a UMTS network where a GLR serves MSC/VLRs in more than one country in accordance with another embodiment of the present invention. In accordance with this embodiment of the present invention after recognizing that the mobile subscriber has crossed country borders and that the regional subscription data needs to be updated the GLR sends a MAP_UPDATE_LOCATION message to the HLR associated with the mobile subscriber. Included the MAP_UPDATE_LOCATION message sent from the GLR to the HLR are, among other parameters, the CC and the NDC of the part of the international network in which the concerned subscriber is currently located. Since these codes are not typically included in the MAP_UPDATE_LOCATION message, other than implicitly in the VLR Number parameter (which may be incorrect in the case of an international network), they would have to be stored in one or two new parameter(s) in this message. By examining these codes the HLR can determine which regional subscription data, i.e. list of Zone Codes, should be transferred to the GLR in the MAP_INSERT_SUBSCRIBER_DATA message.

Figure 19:
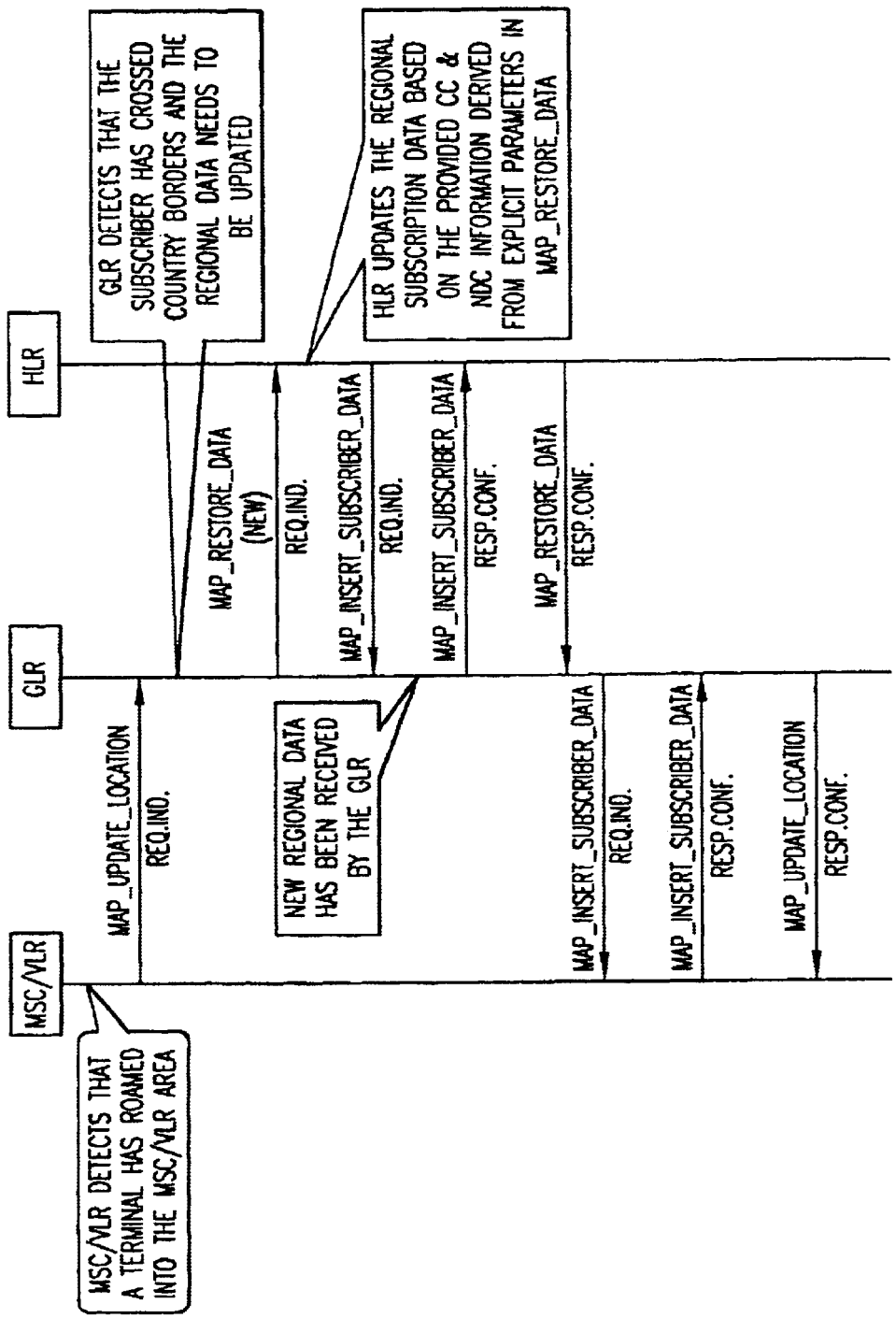

FIG. 19 illustrates exemplary signaling for requesting from an HLR regional subscription information for a particular mobile subscriber in a UMTS network where a GLR serves MSC/VLRs in more than one country in accordance with yet another embodiment of the present invention. When the GLR determines that relevant regional subscription data is required as a result of a subsequent, i.e. not the first, location update, the GLR sends a MAP_RESTORE_DATA message to the HLR. The MAP_RESTORE_DATA message includes, among other parameters, the IMSI of the concerned subscriber, and the CC and NDC associated with the part of the international network in which the concerned subscriber is currently located. The CC and NDC are not typically a part of the currently specified message format of the MAP_RESTORE_DATA message. Hence, they would have to be stored in one or two new parameter(s) in the MAP_RESTORE_DATA message. Like the MAP_UPDATE_LOCATION message described above in connection with FIG. 17 the MAP_RESTORE_DATA message will trigger the HLR to send a MAP_INSERT_SUBSCRIBER_DATA to the GLR. Similar to the procedure described above in connection with FIG. 17 the HLR can use the CC and the NDC to determine which regional subscription data (i.e. the list of Zone Codes) that should be transferred to the GLR in the MAP_INSERT_SUBSCRIBER_DATA message.

Figure 20:
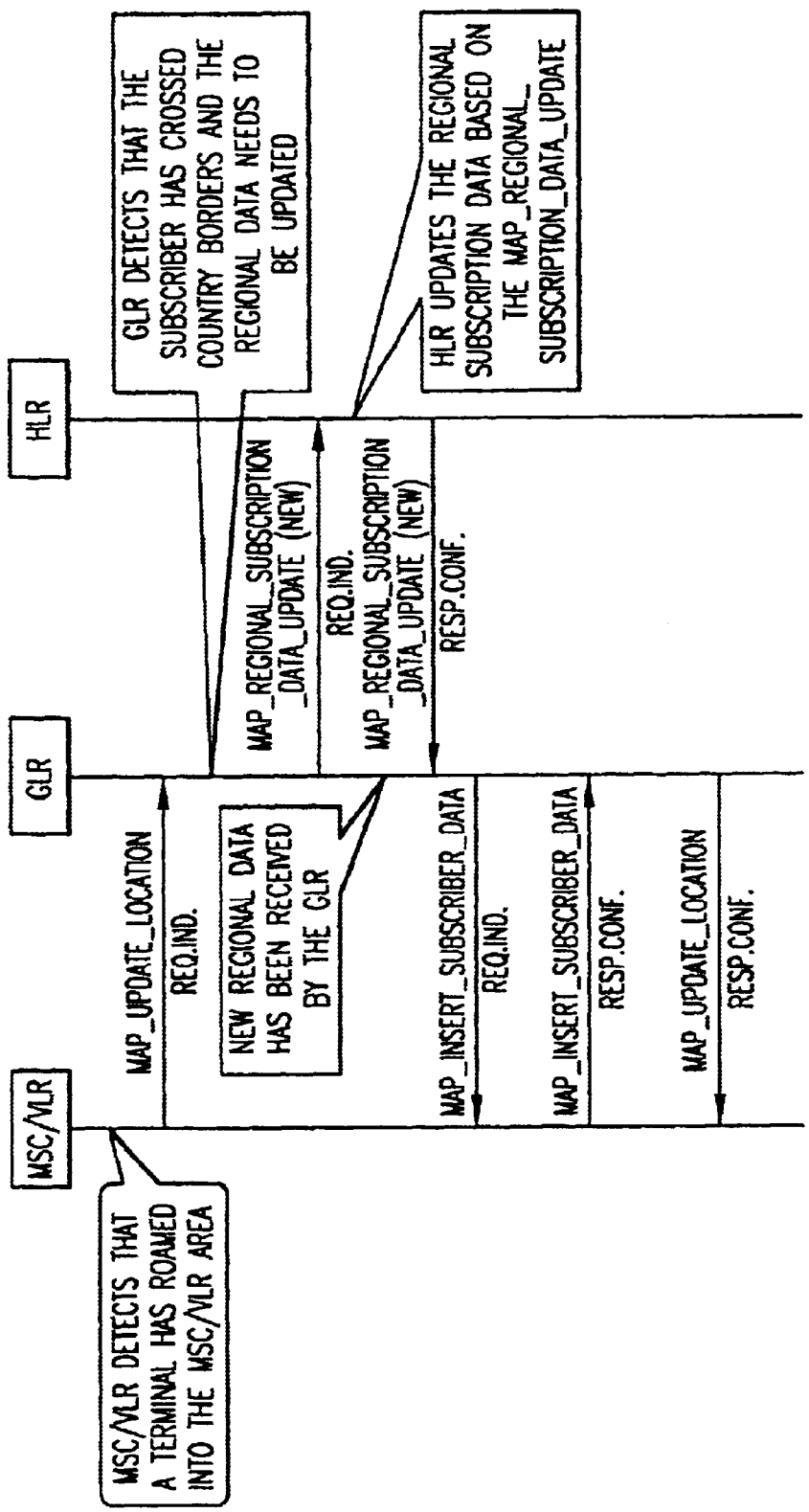

FIG. 20 illustrates exemplary signaling for requesting from an HLR regional subscription information for a particular mobile subscriber in a UMTS network where a GLR serves MSC/VLRs in more than one country in accordance with another embodiment of the present invention. When the GLR determines that relevant regional subscription data is required for a particular mobile subscriber as a result of a subsequent location update (i.e. not the first) the GLR sends an explicit request for regional subscription data to the HLR in a new MAP message. This MAP message can be referred to as a MAP_REGIONAL_SUBSCRIPTION_DATA_UPDATE request message. The MAP_REGIONAL_SUBSCRIPTION_DATA_UPDATE request message can include, among other things, the CC and NDC of the part of the international network in which the concerned subscriber is currently located. The HLR returns the relevant regional subscription data to the GLR in another new MAP message referred to as a MAP_REGIONAL_SUBSCRIPTION_DATA_UPDATE response confirmation.

An optional feature which could be implemented in any of the procedures described above in connection with FIGS. 17–20 is for the HLR to indicate to the GLR that there is no Regional Subscription Data specified for the concerned subscriber, for the specific visited network or in any visited network. This could be indicated in an optional parameter in the MAP_INSERT_SUBSCRIBER_DATA message or in the specifically designed reply message in the procedures described above in connection with FIG. 20. The advantage of this feature is that subsequent redundant requests for regional subscription data can be avoided.

Figure 21:
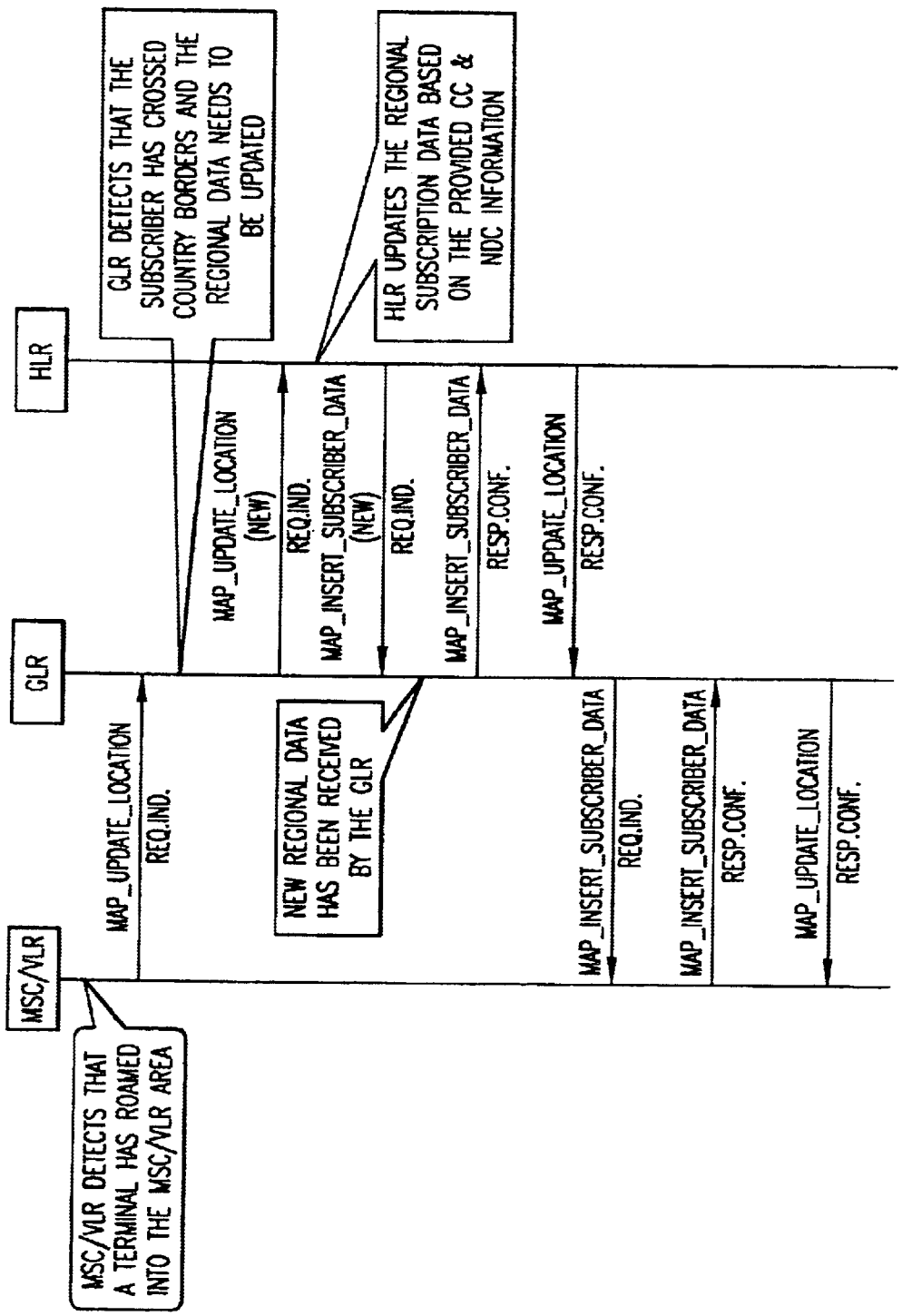

FIG. 21 illustrates exemplary signaling for requesting from an HLR regional subscription information for a particular mobile subscriber in a UMTS network where a GLR serves MSC/VLRs in more than one country in accordance with yet another embodiment of the present invention. In accordance with this embodiment of the present invention, as compared to the embodiments described above in connection with FIGS. 17–20, the GLR will only request the regional subscription data upon the first location update with the HLR. Accordingly, upon the first location update request from a certain visiting subscriber, the GLR sends a MAP_UPDATE_LOCATION message to the home HLR of the concerned subscriber, including a list of all the valid combinations of Country Codes and National Destination Codes for the visited international network. This list of code combinations can be transferred using a new optional parameter in the MAP_UPDATE_LOCATION message. The HLR could then, in the MAP_INSERT_SUBSCRIBER_DATA, include one list of Zone codes for each received combination of Country Code and National Destination Code. Each list could be headed by the appropriate combination of Country Code and National Destination Code. Alternatively, the regional subscription zones could be transferred as a single list of complete Regional Subscription Zone Identities.

After this single transfer of regional subscription data, no more requests are needed, as long as the concerned subscriber remains in the network of the GLR. Upon the reception of a subsequent MAP_UPDATE_LOCATION message from an MSC/VLR in the GLR's own network, the GLR can itself create the relevant list of Zone Codes to be transferred to the MSC/VLR. By providing all the relevant regional subscription data to the GLR upon the first location update with the HLR, the amount of internetwork signaling is reduced.

Figure 22:
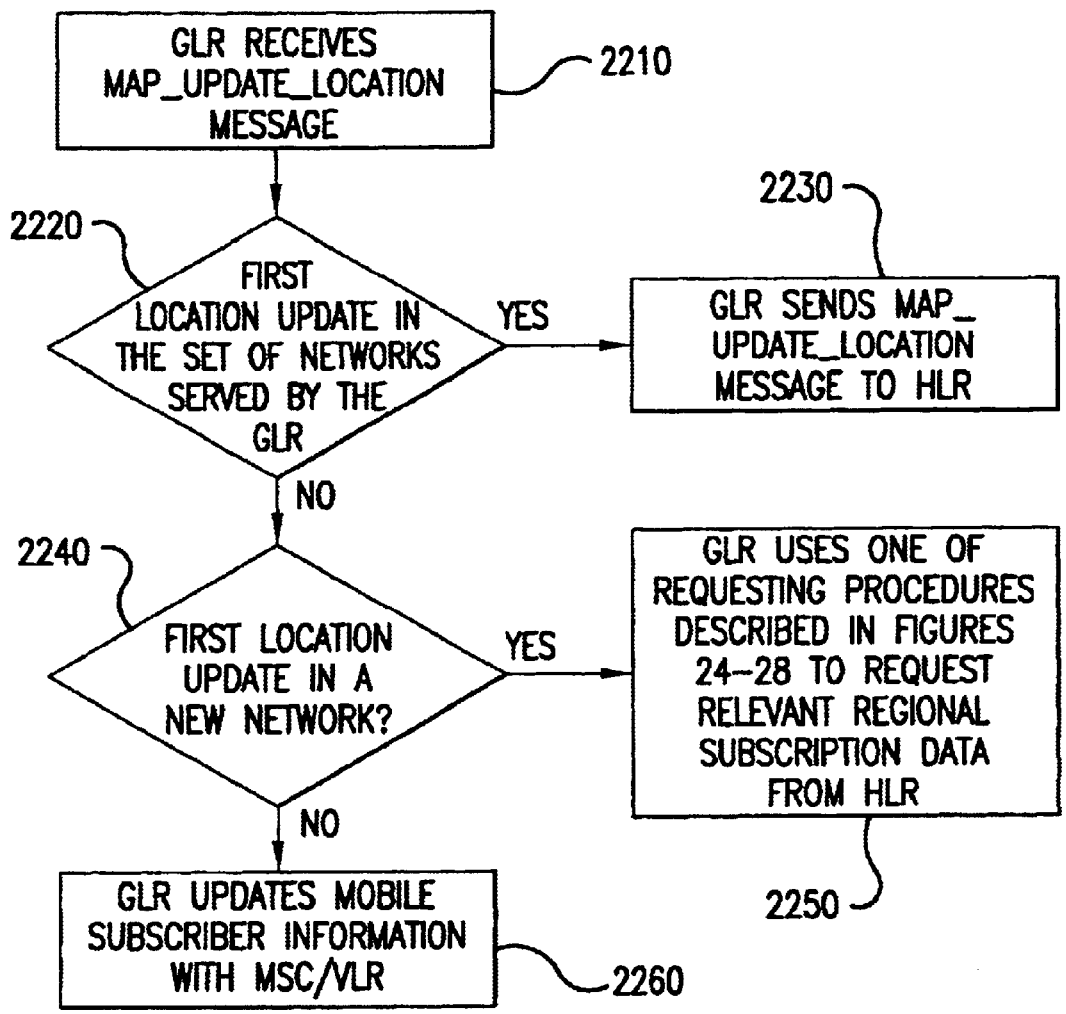
FIG. 22 illustrates an exemplary method in a GLR for determining when regional subscription data should be requested by a GLR when the GLR serves MSC/VLRs of multiple networks in the same country in accordance with one embodiment of the present invention.

FIG. 22 illustrates an exemplary method for determining when regional subscription data should be requested by a GLR when the GLR serves MSC/VLRs of multiple networks in the same country in accordance with one embodiment of the present invention. In step 2210 the GLR receives a MAP_UPDATE_LOCATION request message from an MSC/VLR. In step 2220 the GLR determines whether this is the first location update for the mobile subscriber in the set of networks served by the GLR. The GLR can determine whether this is the first location update for the mobile subscriber in the set of networks served by the GLR by checking whether there is already a record for the concerned subscriber stored in the GLR. If this is the first location update for the mobile subscriber in the set of networks served by the GLR, in accordance with the "Yes" path out of decision step 2220, the GLR sends a MAP_UPDATE_LOCATION request message to the HLR in accordance with step 2230.

If the GLR determines that this is not the first location update for the mobile subscriber in the set of networks served by the GLR, in accordance with the "No" path out of decision step 2220, the GLR determines whether this is the first location update for the mobile subscriber in a new network in accordance with step 2240. The GLR can determine whether this is the first location update for the mobile subscriber in a new network by comparing the NDC of the new VLR number, which is received in the MAP_UPDATE_LOCATION message from the MSC/VLR, with the NDC in the old VLR number, which was already stored in the GLR. If the GLR determines that this is the first location update for the mobile subscriber in a new network, in accordance with the "Yes" path out of decision step 2240, the GLR uses one of the requesting procedures described below in connection with FIGS. 24–28 to request the relevant regional subscription data from the HLR. If the GLR determines that this is not the first location update for the mobile subscriber in a new network, in accordance with the "No" path out of decision step 2240, the GLR updates the mobile subscriber information with the MSC/VLR without informing the HLR in accordance with step 2260.

Figure 23:
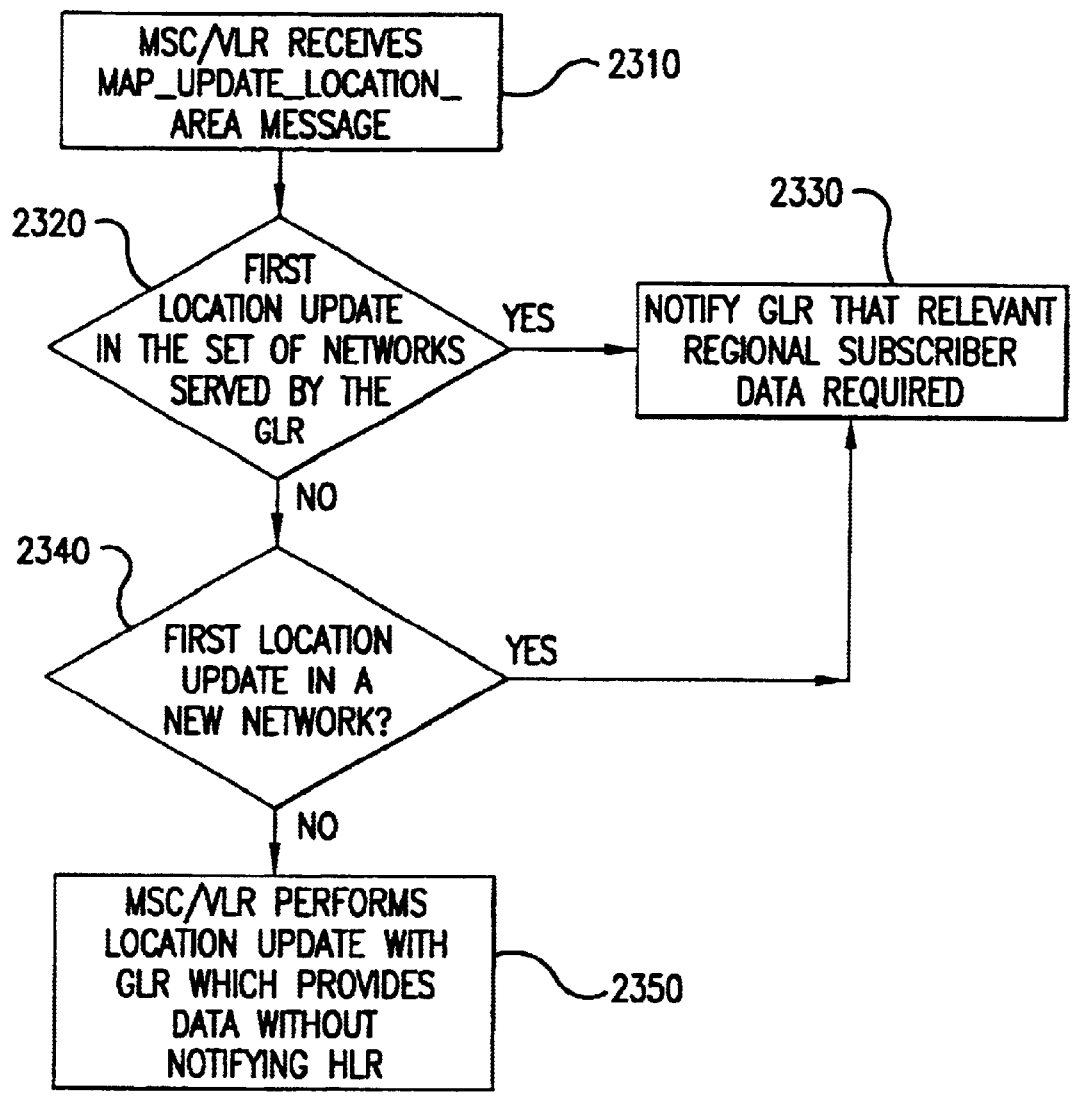
FIG. 23 illustrates an exemplary method in an MSC/VLR for determining when regional subscription data should be requested by a GLR when the GLR serves MSC/VLRs of multiple networks in the same country in accordance with another embodiment of the present invention.
Figure 24:
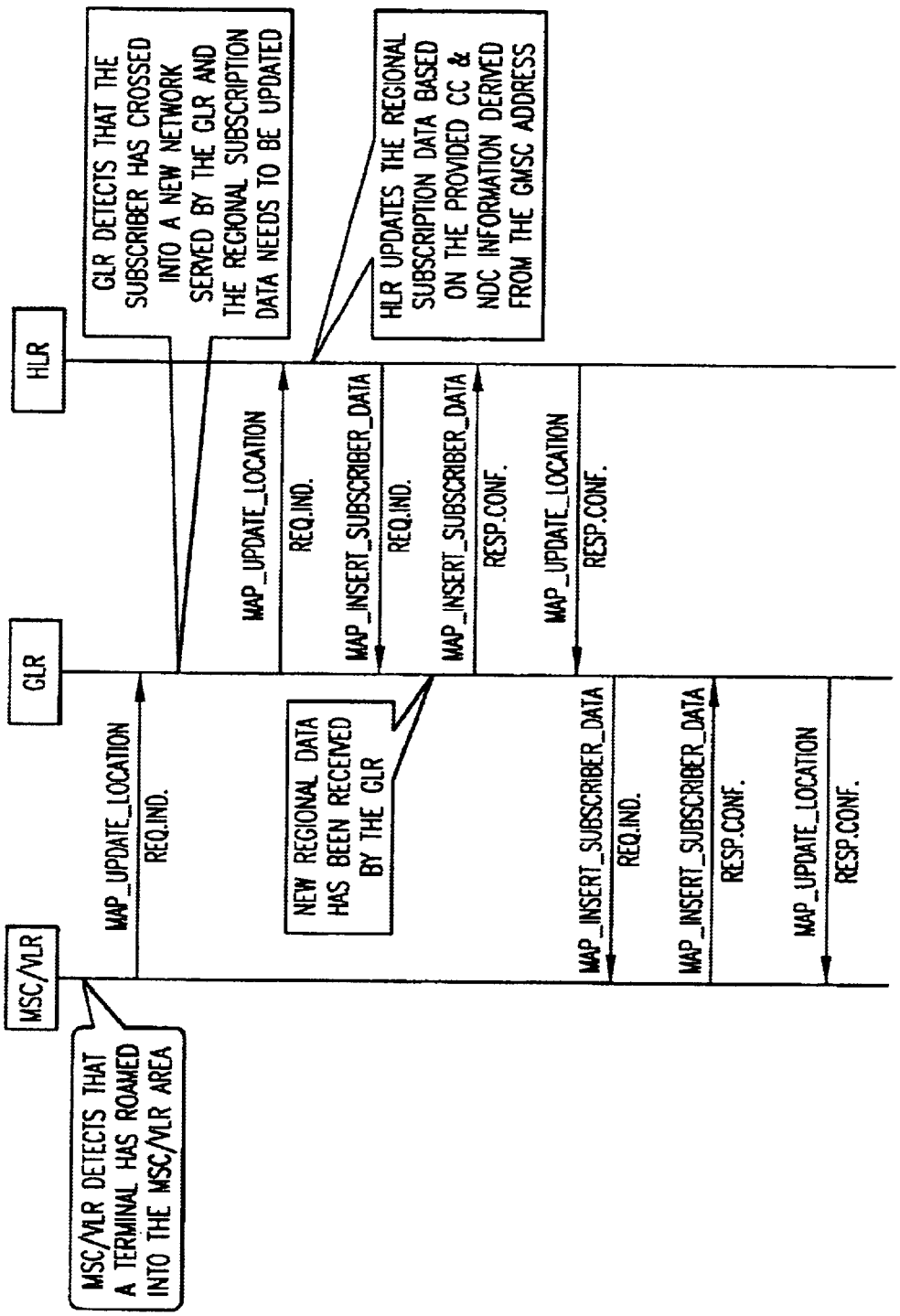
FIGS. 24–28 illustrate exemplary signaling for requesting from an HLR regional subscription information for a particular mobile subscriber in a UMTS network where a single GLR serves a plurality of networks located in the same country in accordance with various embodiments of the present invention.
Figure 25:
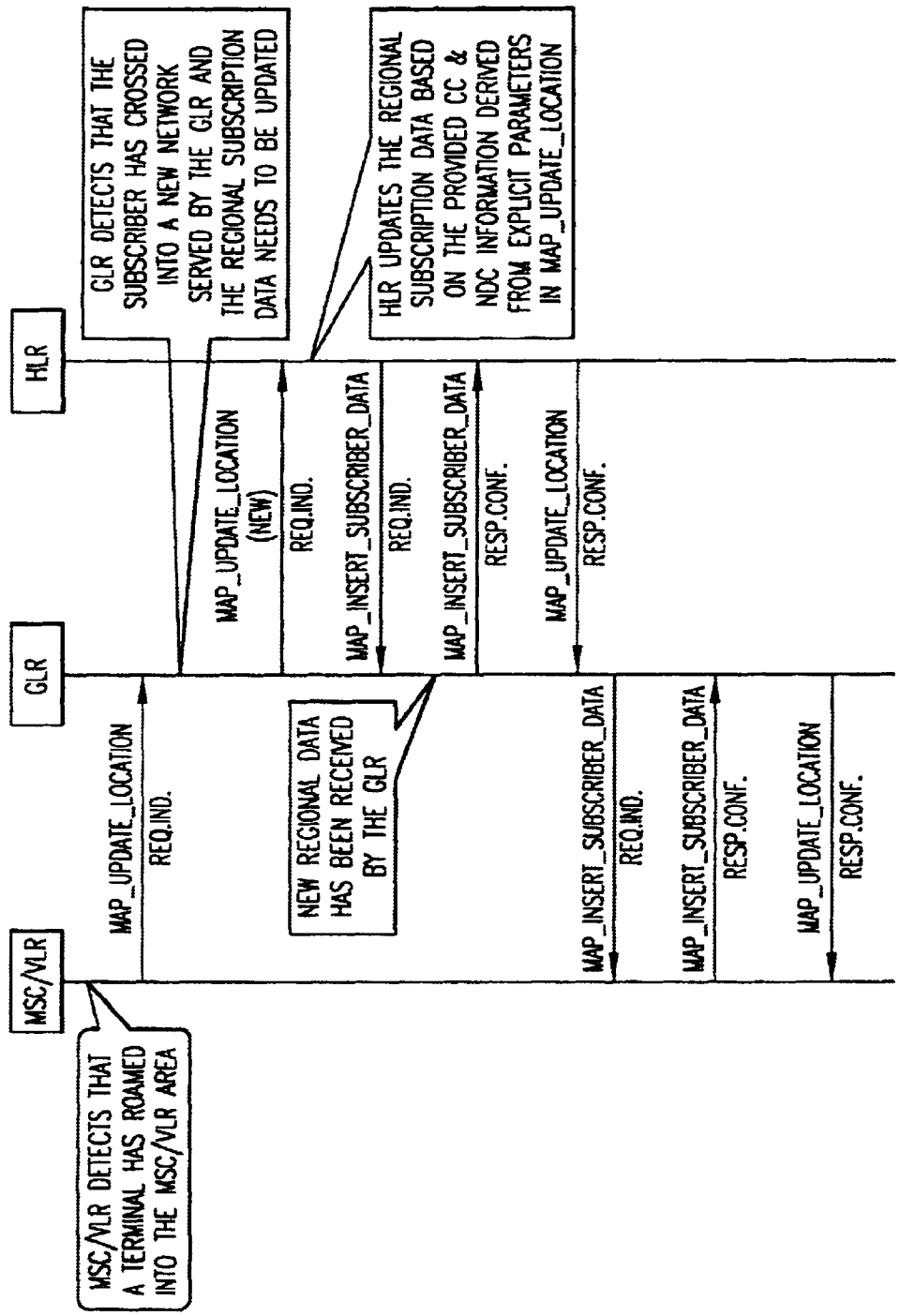
Figure 26:
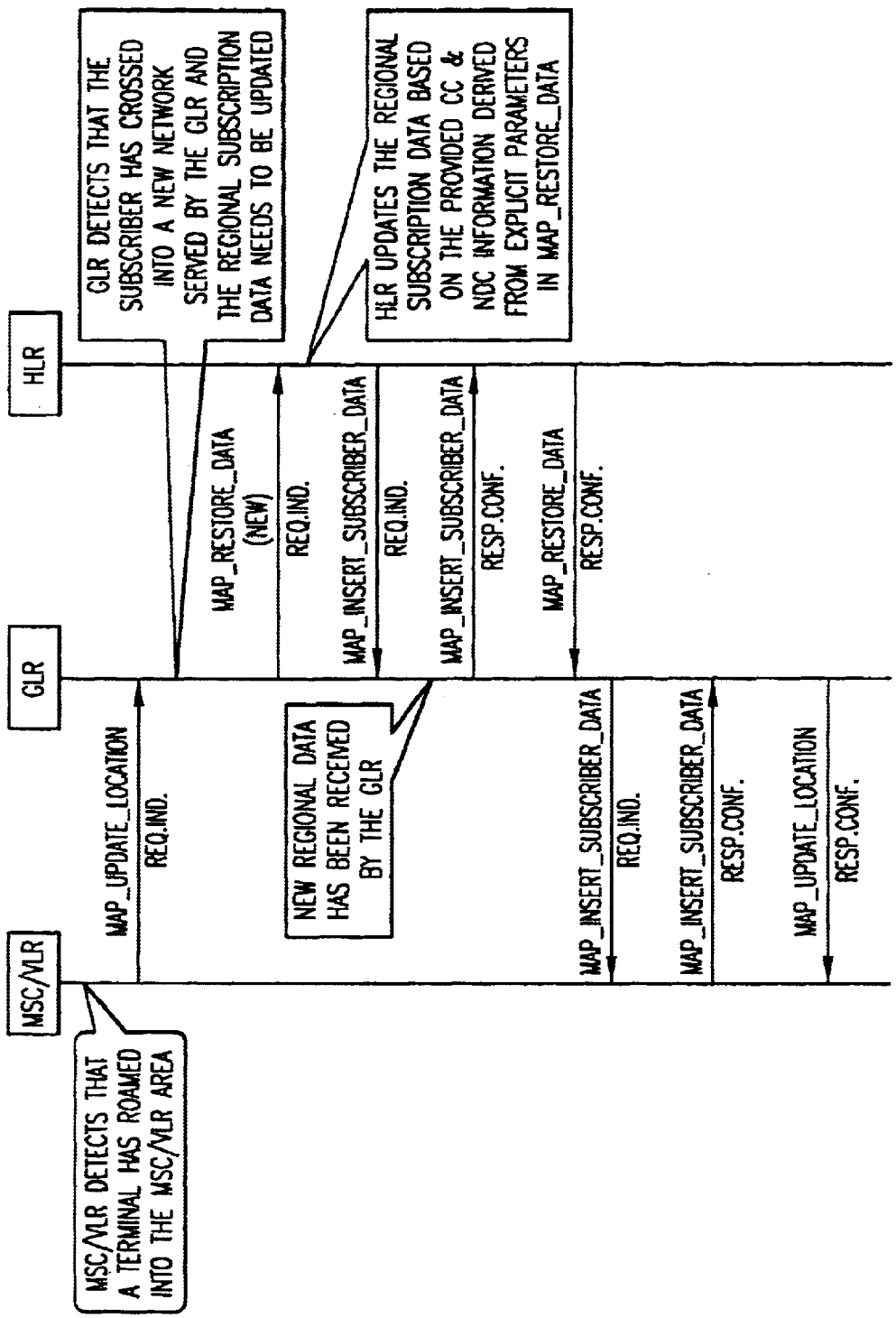
Figure 27:
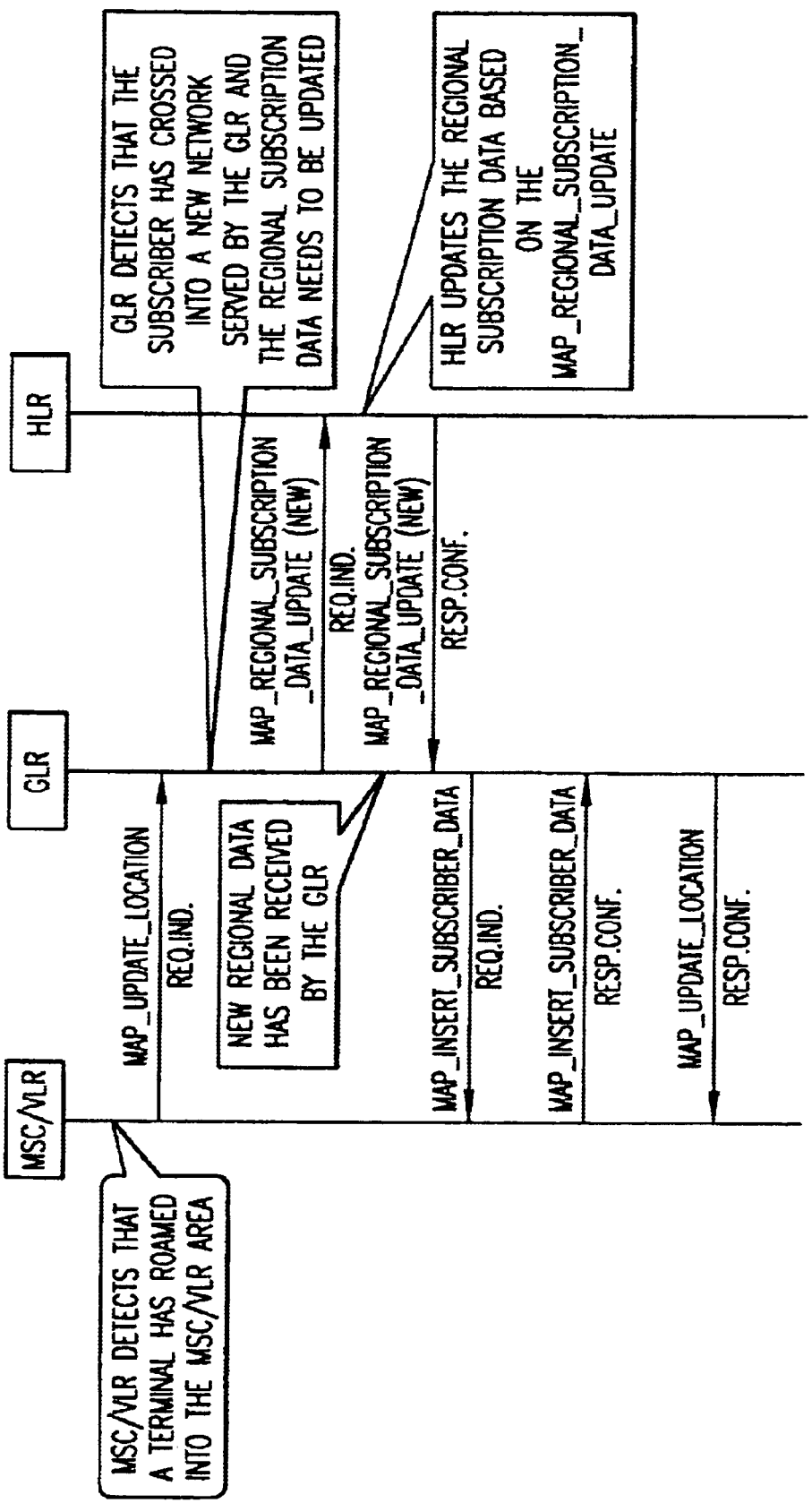
Figure 28:
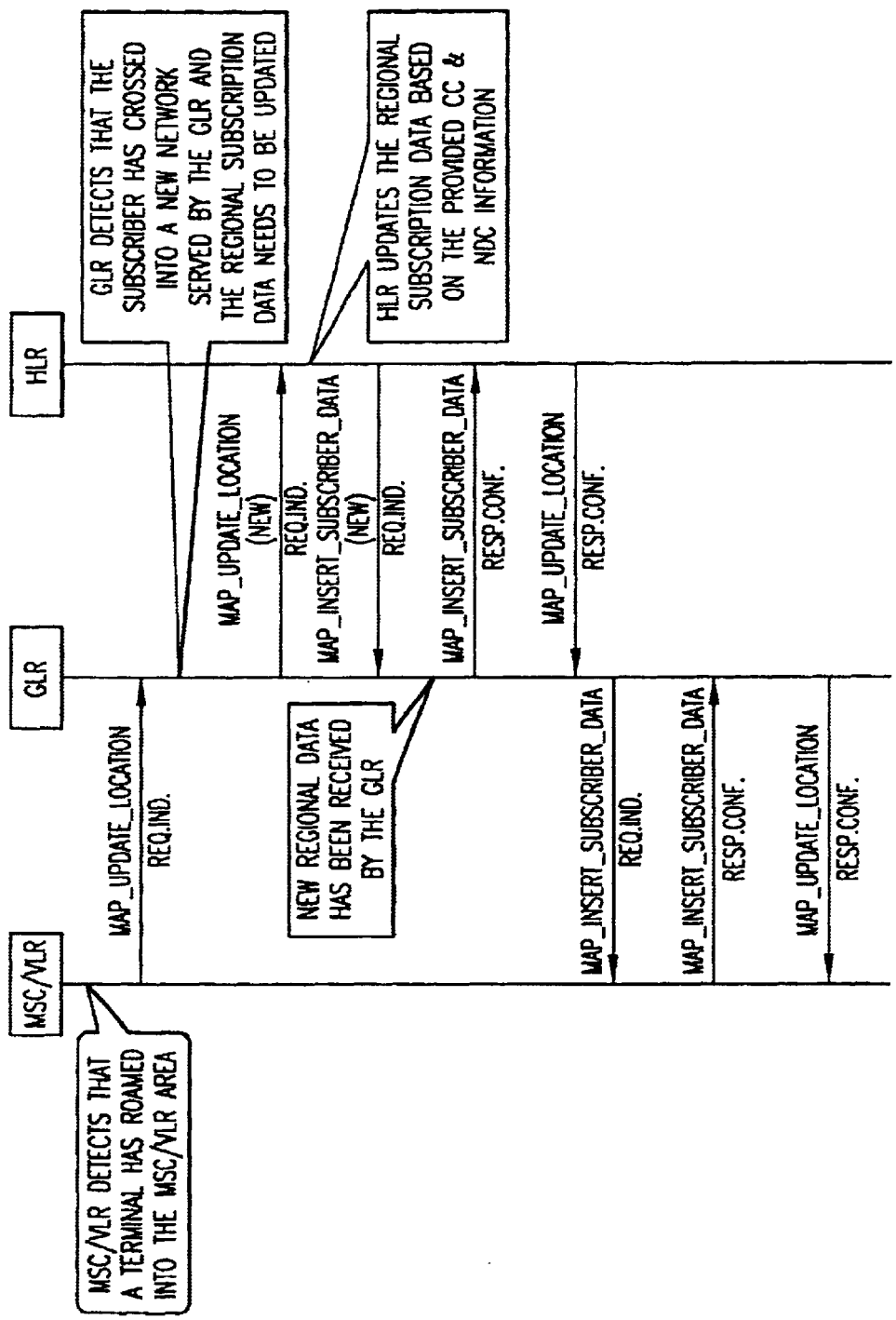

FIG. 23 illustrates an exemplary method for determining when regional subscription data should be requested by a GLR when the GLR serves MSC/VLRs of multiple networks in the same country in accordance with another embodiment of the present invention. In accordance with this embodiment of the present invention the MSC/VLR determines whether updated regional subscription data is required. In step 2310 the MSC/VLR receives a MAP_UPDATE_LOCATION_AREA message from a mobile subscriber. In step 2320 the MSC/VLR determines whether this is the first location update for the mobile subscriber in the set of networks served by the GLR. The MSC/VLR can determine whether this is the first location update for the mobile subscriber in the set of networks served by the GLR by comparing the Mobile Network Codes of the old and the new Location Area Identities. If the MSC/VLR determines that this is the first location update for the mobile subscriber in the set of networks served by the GLR, in accordance with the "Yes" path out of decision step 2320, the MSC/VLR notifies the GLR that the relevant regional subscription data is required in accordance with step 2330.

If the MSC/VLR determines that this is not the first location update in the set of networks served by the GLR, in accordance with the "No" path out of decision step 2320, the MSC/VLR determines whether this is the first location update in a new network for the mobile subscriber in accordance with step 2340. The MSC/VLR cannot determine whether this is the first location update in a new network for the mobile subscriber by comparing the old and the new Location Area Identity, unless the MSC/VLR can recognize all the Mobile Network Codes of the other networks served by the same GLR. It is not crucial for the MSC/VLR to make this determination as it is part of the normal operation of the GLR to recognize the first location update of a subscriber in its service area. However, it is of course possible to store these codes as configuration data in the MSC/VLRs by agreement between the network operators sharing the GLR.

If the MSC/VLR determines that this is the first location update for the mobile subscriber in a new network, in accordance with the "Yes" path out of decision step 2340, the MSC/VLR notifies the GLR that the relevant regional subscription data is required in accordance with step 2330. If the MSC/VLR determines that this is not the first location update for the mobile subscriber in a new network, in accordance with the "No" path out of decision step 2340, the MSC/VLR performs a location update procedure with the GLR in accordance with step 2350. The GLR will provide the MSC/VLR with the relevant regional subscription data without requesting this information from the HLR.

It should be apparent to one skilled in the art that the methods described above in connection with FIGS. 15 and 16 where a single GLR serves MSC/VLRs location in more than one country and the methods described above in connection with FIGS. 22 and 23 where a single GLR serves a plurality of networks located in the same country are similar. For example, the methods performed by the GLR in FIGS. 15 and 22 allow the GLR to determine when it is necessary to request regional subscription data for a particular mobile subscriber from an HLR. Similarly, the methods performed by the MSC/VLR in FIGS. 16 and 23 allow an MSC/VLR to determine when it is necessary to have the GLR request regional subscription data for a particular mobile subscriber. The difference between the methods of FIGS. 15 and 16 as compared with the methods of FIGS. 22 and 23 is how these decisions are made by either the GLR or the MSC/VLR. In other words, the type of determinations made in the GLR and MSC/VLR are different, i.e., the GLR makes different determinations in decision steps 1520 and 1540 as compared with decision steps 2220 and 2240; and the MSC/VLR makes different determinations in decision steps 1620 and 1640 as compared with decision steps 2320 and 2340.

Accordingly, a detailed description of similar elements in FIGS. 17–21 and FIGS. 24–28 will be omitted and the differences between the figures are highlighted below. The difference between FIGS. 17–21 and FIGS. 24–28 is what is being detected. In the description above in connection with FIGS. 17–21 the GLR or MSC/VLR is determining whether the mobile subscriber has crossed into a different country served by the same GLR as the previous country, and hence, requires updated regional subscription data. Accordingly, in FIGS. 17–21 after receiving a MAP_UPDATE_LOCATION request message from the MSC/VLR the GLR determines whether the mobile subscriber has crossed country borders. The GLR makes this determination either using the method described in FIG. 15 or by an indication provided by an MSC/VLR who has performed the method described in FIG. 16. In FIGS. 24–28 after receiving a MAP_UPDATE_LOCATION request message from the GLR determines whether the mobile subscriber has roamed between two different networks in the same country served by the same GLR. The GLR makes this determination either using the method described in FIG. 22 or by an indication provided by an MSC/VLR who has performed the method described in FIG. 23. Therefore, in FIGS. 24–28 there is a text label stating that the GLR detects that the subscriber has crossed into a new network served by the GLR and the regional subscription data needs to be updated.

The type of information contained in the MAP_UPDATE_LOCATION request message sent from the GLR to the HLR is another difference between the procedures illustrated in FIGS. 18–21 and those illustrated in FIGS. 25–28. As described above in connection with FIGS. 18–21 the MAP_UPDATE_LOCATION request message, the MAP_RESTORE_DATA request message, and the MAP_REGIONAL_SUBSCRIPTION_DATA_UPDATE request message respectively include the CC and NDC of the part of the international network in which the concerned subscriber is currently located. Since the procedure illustrated in FIGS. 25–28 is concerned with multiple networks within a single country the GLR is not part of an international network. Accordingly, in the procedure illustrated in FIGS. 25–28 the MAP_UPDATE_LOCATION request message, the MAP_RESTORE_DATA request message, and the MAP_REGIONAL_SUBSCRIPTION_DATA_UPDATE request message respectively contain the CC and NDC of the network in which the mobile subscriber is currently located.

In accordance with another embodiment of the present invention multiple GLR numbers can be associated with the GLR serving multiple networks in a single country. For example, a GLR serving networks A, B and C would have three numbers associated with it: one having the CC and NDC of network A, one having the CC and NDC of network B, and one having the CC and NDC of network C. Since all the networks are located in the same country, all the numbers will have the same CC. However, to individually identify the networks the CC is followed by different NDCs.

When relevant Regional Subscription Data is needed as a result of a first location update in one of the networks served by the GLR, e.g., network B, the GLR sends a MAP_UPDATE_LOCATION request message to the HLR. Included in the MAP_UPDATE_LOCATION request message, in the VLR Number parameter, is the GLR number with the CC and NDC of the concerned network, e.g., network B. These are the same codes that were included in the VLR number received in the MAP_UPDATE_LOCATION request message from the MSC/VLR to the GLR. The HLR can then, in the normal manner, select the relevant regional subscription data based on the CC and NDC in the number received in the VLR Number parameter, i.e. the GLR number in this case. Following the regular procedures the selected regional subscription data will be included in the MAP_INSERT_SUBSCRIBER_DATA indication message from the HLR to the GLR. This embodiment provides a complete solution that does not require any modification of the existing GSM MAP.

The same methods (as for the case of the international network using a single GLR) to give the HLR the possibility to indicate to the GLR that there is no regional subscription data specified for the concerned subscriber (for the specific set of visited networks served by the GLR or in any visited network) is equally applicable in the case of multiple networks in the same country served by the same GLR.

Accordingly, using the methods and apparatus described above, a network including a GLR (and MSC/VLRs) can handle the administration of regional subscription data for visiting subscribers with little or no modifications of the GSM 09.02 (MAP) specification. This facilitates the inclusion of the GLR in the UMTS specifications.

Figure 29:
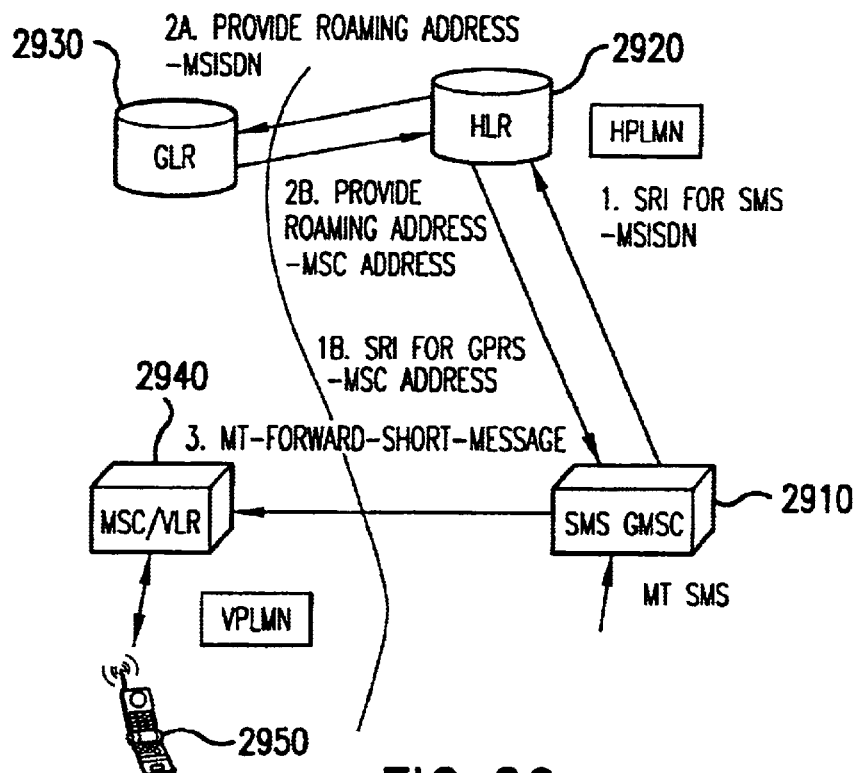
FIG. 29 illustrates an exemplary UMTS network for routing MT SMS messages where a GLR serves a plurality of MSC/VLRs in accordance with an exemplary embodiment of the present invention.

FIG. 29 illustrates an exemplary UMTS network for routing MT SMS messages where a GLR serves a plurality of MSC/VLRs in accordance with an exemplary embodiment of the present invention. The network includes SMS GMSC 2910, HLR 2920, GLR 2930 and MSC/VLR 2940. In accordance with this embodiment of the present invention HLR 2920 is notified of the existence of GLR 2930 within the VPLMN. This notification can be performed via explicit notifications or implicit notifications.

The implicit notification is provided by the MAP_UPDATE_LOCATION message. Typically, the MAP_UPDATE_LOCATION message contains the VLR number and the MSC address. In a network where a GLR serves a plurality of MSC/VLRs, the GLR will replace the VLR number by its own number, i.e., GLR number. In accordance with exemplary embodiments of the present invention the GLR replaces the MSC address by a "dummy" address, e.g. all zeros. Accordingly, the "dummy" address notifies the HLR that the number in the VLR number parameter is the number of a GLR. This implicit indication does not require any modification of the format of the MAP_UPDATE_LOCATION message.

The explicit notification of the presence of a GLR in the VPLMN can be provided using an additional parameter within the MAP_UPDATE_LOCATION message. Accordingly, the HLR can determine whether a GLR is present in the network by examining this parameter in the received MAP_UPDATE_LOCATION message. In either case the HLR will be notified of the existence of the GLR by the dummy address or the explicit parameter within the MAP_UPDATE_LOCATION message.

Once the mobile subscriber 2950 has performed a location update and the presence of a GLR has been indicated to HLR 2920 the mobile subscriber 2950 can receive MT SMS messages. Accordingly, SMS GMSC 2910 receives the MT SMS message and sends a SEND_ROUTING_INFO_FOR_SMS message to HLR to request the routing information regarding the current location of mobile subscriber 2950. HLR 2920 checks the stored MSC Address (if the implicit method is employed) or a flag indicating that the VPLMN uses the GLR node in their PLMN. If the MSC address is a dummy address, e.g., all zeros, or if the GLR available flag is active HLR 2920 requests the address of the MSC/VLR which is currently serving the mobile subscriber from GLR 2930. To request the address of the MSC/VLR which is currently serving mobile subscriber 2950, HLR 2920 sends a new GSM MAP message to the VPLMN's GLR 2930. For example, the new GSM MAP message could be a MAP_PROVIDE_ROAMING_ADDRESS request message.

In response to the MAP_PROVIDE_ROAMING_ADDRESS request message GLR 2930 sends the address of MSC/VLR 2940 in a MAP_PROVIDE_ROAMING_ADDRESS response message. The MAP_PROVIDE_ROAMING_ADDRESS request and response messages can have a similar format. Upon receipt of the address of MSC/VLR 2940, HLR 2920 will respond to the MAP_SEND_ROUTING_INFO_FOR_SMS message by providing the required MSC/VLR address to SMS GMSC 2910. SMS GMSC 2910, using the address provided by HLR 2920, will then be able to send a MAP_MT_FORWARD_SHORT_MESSAGE to MSC/VLR 2940. MSC/VLR 2940 forwards the MT SMS message to the mobile subscriber 2950.

The exemplary network illustrated in FIG. 29 provides a UMTS network including a GLR where an MT SMS path can be established without interworking nodes. Elimination of interworking nodes reduces the delay times in forwarding the MT SMS message within the network. Further, in a MT SMS message scenario the GLR is more suitable for implementation since it does not have integrated or co-allocated interworking nodes, such as the GMSC. In addition the GMSC need not be modified to support MAP SMS related operations, i.e., MAP_MT_FORWARD_SHORT_MESSAGE, MAP_SEND_ROUTING_INFO_FOR_SMS, etc. Further, the GMSC need not be modified to support unpacking SMS messages to retrieve the mobile subscriber identity, e.g., the IMSI. One skilled in the art will recognize that the methods related to short message service delivery described above are equally applicable in a UMTS system including SGSNs which are utilized for delivery of mobile terminating short messages.

Figure 30:
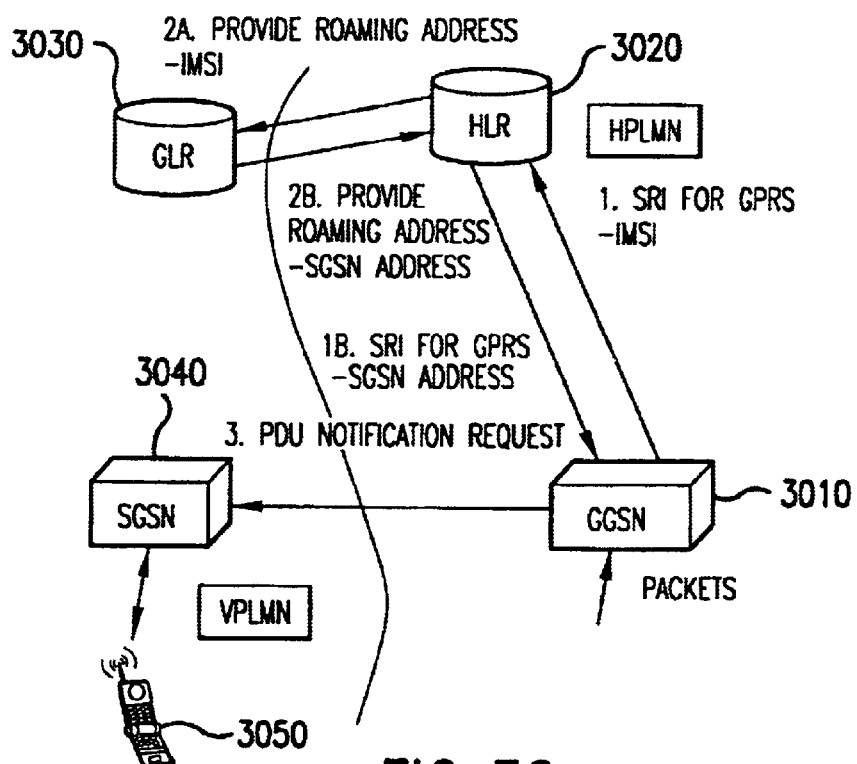
FIG. 30 illustrates an exemplary UMTS network for routing packet data where a GLR serves a plurality of SGSNs in accordance with an exemplary embodiment of the present invention.

FIG. 30 illustrates an exemplary UMTS network for routing packet data where a GLR serves a plurality of SGSNs in accordance with an exemplary embodiment of the present invention. The network includes GGSN 3010, HLR 3020, GLR 3030 and SGSN 3040. In accordance with this embodiment of the present invention HLR 3020 is notified of the existence of GLR 3030 within the VPLMN. This notification can be performed via explicit notifications or implicit notifications.

The implicit notification can be performed using information included in the MAP_UPDATE_GPRS_LOCATION message. The MAP_UPDATE_GPRS_LOCATION message typically includes the SGSN number and the SGSN address. The GLR 3030 replaces the SGSN number by its own number, i.e. the GLR number. In addition, GLR 3030 replaces the SGSN address by a "dummy" address, e.g. all zeros. Accordingly, HLR 3020 can determine that the SGSN is served by a GLR by determining whether the SGSN address contains a dummy address. The implicit indication is advantageous because it does not require any modification of the format of the MAP_UPDATE_GPRS_LOCATION message. The explicit notification can be provided by including an additional parameter within the MAP_UPDATE_GPRS_LOCATION message. This additional parameter indicates to the HLR that a GLR is used within the VPLMN.

When GGSN 3010 initiates a network-initiated PDP context setup procedure, GGSN 3010 requests routing information from HLR 3020. HLR 3020, having determined that the VPLMN uses GLR 3030 by either the explicit or implicit notification procedures described above, requests the actual SGSN address, i.e., the address of SGSN 3040, from GLR 3030. GGSN 3010 can request routing information from HLR 3020 by sending the MAP_SEND_ROUTING_INFO_FOR_GPRS message.

HLR 3020 checks the stored SGSN address (if the implicit method is employed), or it can check a flag indicating that the VPLMN uses GLR 3030. If the SGSN address is a dummy IP address, e.g. 000.000.000.000, or if the GLR available flag is active, then HLR 3020 sends a request for the actual SGSN address from the GLR 3030. HLR 3020 sends a new GSM MAP message to GLR 3030 to request the actual SGSN address. This new GSM MAP message is referred to as a MAP_PROVIDE_

ROAMING_ADDRESS request message. GLR 3030 responds to the MAP_PROVIDE_ROAMING_ADDRESS request message with the actual SGSN address included in a MAP_PROVIDE_ROAMING_ADDRESS response message which has a similar format to the MAP_PROVIDE_ROAMING_NUMBER request message.

HLR 3020 responds to the MAP_SEND_ROUTING_INFO_FOR_GPRS message by providing the required SGSN address to GGSN 3010. GGSN 3010 then sends a PDU_NOTIFICATION REQUEST to SGSN 3040. SGSN 3040 then forwards the packet data to mobile subscriber 3050.

The exemplary network illustrated in FIG. 30 provides a UMTS network including a GLR where an PDP context setup can be established without interworking nodes. Elimination of interworking nodes reduces the delay times in forwarding the packet data within the network. Further, the network will have also better latency characteristics for Multi-Media type applications. In addition, a packet data GLR will be more suitable for implementation since it does not have integrated or co-allocated interworking nodes, such as the ISGSN.

The present invention has been described by way of exemplary embodiments to which the invention is not limited. Modifications and changes will occur to those skilled in the art without departing from the spirit and scope of the invention as defined in the appended claims.

What is claimed is:

1. In a network where a gateway location register serves a first visitor location register in a first country and a second visitor location register in a second country, a method for providing regional subscription data to a serving visitor location register comprising the steps of:
   responsive to receiving a location update from a mobile subscriber in a network said serving visitor location register sending a MAP_UPDATE_LOCATION request message to the gateway location register:
   determining whether this is the first location update for the mobile subscriber in a network served by the gateway location register;
   determining whether this is the first location update in a new country for the mobile subscriber; and
   forwarding the MAP_UPDATE_LOCATION request message to, and requesting regional subscription data from a home location register associated with the mobile subscriber if the location update is not the first location update for the mobile subscriber in the network and if the location update is the first location update for the mobile subscriber in the new country, wherein the forwarded MAP_UPDATE_LOCATION request message includes a dummy mobile switching center location address to indicate the presence of the gateway location register.

2. The method of claim 1, wherein the MAP_UPDATE_LOCATION request message includes a gateway mobile switching center address, which indicates to the home location register the country in which the mobile subscriber is currently located.

3. The method of claim 1, wherein the MAP_UPDATE_LOCATION request message includes a gateway mobile switching center address, which indicates a country code and national destination code associated with a visitor location register which is serving the mobile subscriber.

4. The method of claim 1, wherein the MAP_UPDATE_LOCATION request message includes a field, which contains a country code and national destination code associated with a visitor location register which is currently serving the mobile subscriber.

5. The method of claim 1, wherein, as a result of a location update subsequent to the first location update the regional subscription data is requested by the gateway location register sending a MAP_RESTORE_DATA request message to the home location register.

6. The method of claim 5, wherein the MAP_RESTORE_DATA request message includes a field, which contains a country code and national destination code associated with a visitor location register, which is currently serving the mobile subscriber.

7. The method of claim 5, wherein the regional subscription data is requested by the gateway location register sending an explicit request message to the home location register.

8. The method of claim 7, wherein the explicit request message is a message specifically designed to request regional subscription data and wherein the explicit request message includes a country code and national destination code associated with a visitor location register serving the mobile subscriber.

9. The method of claim 7, wherein a list of zone codes are transferred from the home location register to the gateway location register in an explicit reply message.

10. The method of claim 1, wherein the determining steps are performed by the gateway location register.

11. The method of claim 1, wherein the determining steps are performed by a visitor location register serving the mobile subscriber in the new country.

12. The method of claim 1, wherein if it is determined that this is the first location update for the mobile subscriber in the network, performing the step of:
   sending a MAP_UPDATE_LOCATION request message including all combinations of country codes and national destination codes associated with visitor location registers served by the gateway location register.

13. In a network where a gateway location register serves a first visitor location register in a first network and a second visitor location register in a second network, the first and second networks being located in a same country, a method for providing regional subscription data to a serving visitor location register comprising the steps of:
   responsive to receiving a location update from a mobile subscriber in a network said serving visitor location register sending a MAP_UPDATE_LOCATION request message to the gateway location register;
   determining whether this is the first location update for the mobile subscriber in the first and second networks;
   determining whether this is the first location update for the mobile subscriber in a new network served by the gateway location register;
   forwarding the MAP_UPDATE_LOCATION request message to, and requesting regional subscription data from, a home location register associated with the mobile subscriber if the location update is not the first location update for the mobile subscriber in the first and second networks and if the location update is the first location update for the mobile subscriber in the new network wherein the forwarded MAP_UPDATE_LOCATION request message includes a dummy mobile switching center address to indicate that the network includes a GLR.

14. The method of claim 13, wherein the regional subscription data is requested by the gateway location register sending a MAP_UPDATE_LOCATION request message to the home location register.

15. The method of claim 14, wherein the MAP_UPDATE_LOCATION message includes a field, which contains a country code and national destination code associated with a visitor location register that is currently serving the mobile subscriber.

16. The method of claim 13, wherein the regional subscription data is requested by the gateway location register sending a MAP_RESTORE_DATA request message to the home location register.

17. The method of claim 13, wherein the regional subscription data is requested by the gateway location register sending an explicit request message to the home location register.

18. The method of claim 17, wherein the explicit request message is a message specifically designed to request regional subscription data and wherein the explicit request message includes a country code and national destination code associated with a visitor location register serving the mobile subscriber.

19. The method of claim 13, wherein the determining steps are performed by the gateway location register.

20. The method of claim 13, wherein the determining steps are performed by a visitor location register serving the mobile subscriber in the new country.

21. The method of claim 13, wherein the gateway location register has a different gateway location register number for each network served by the gateway location register.

22. The method of claim 21, wherein the regional subscription data is requested using the gateway location register number associated with a visitor location register serving the mobile subscriber.

23. In a network where a gateway location register serves a visitor location register, a method for delivering short message service messages to a mobile subscriber located in a visited network comprising the steps of:

indicating to a home location register associated with the mobile subscriber that the gateway location register is present in the visited network;

responsive to receiving a location update from the mobile subscriber, the visitor location register sending a MAP_UPDATE_LOCATION request message to the gateway location register;

forwarding the MAP_UPDATE _LOCATION request message to the home location register, wherein the forward MAP_UPDATE_LOCATION request message includes a dummy mobile switching center address to indicate that the network includes a GLR; and requesting an address of a mobile switching center which is serving the mobile subscriber in the visited network from the gateway location register.

24. The method of claim 23, wherein the MAP_UPDATE_LOCATION request message includes a specific parameter, which indicates to the home location register that the visited network includes a gateway location register.

25. The method of claim 23, further comprising the step of:

checking home location register records to determine whether a flag indicates whether a gateway location register is present in the visited network.

26. In a network where a gateway location register serves a serving support node, a method for delivering packet data to a mobile subscriber located in a visited network comprising the steps of:

indicating to a home location register associated with the mobile subscriber that the gateway location register is present in the visited network;

responsive to receiving a location update from the mobile subscriber, the visitor location resister sending a MAP_UPDATE_GPRS_LOCATION request message to the gateway location resister:

forwarding the MAP_UPDATE_GPRS_LOCATION request message to the home location register, wherein the forwarded MAP_UPDATE_GPRS_LOCATION request message includes a dummy mobile switching center address to indicate that the network includes a GLR; and requesting an address of a serving support node which is serving the mobile subscriber in the visited network from the gateway location register.

27. The method of claim 26, wherein the MAP_UPDATE_GPRS_LOCATION request message includes a specific parameter, which indicates to the home location register that the visited network includes a gateway location register.

28. The method of claim 26, further comprising the step of:

checking home location register records to determine whether a flag indicates whether a gateway location register is present in the visited network.

29. The method of claim 26, wherein the serving support node is a general packet radio service (GPRS) support node.

* * * * *